United States Patent
Lee et al.

(10) Patent No.: US 11,431,909 B2
(45) Date of Patent: Aug. 30, 2022

(54) ELECTRONIC DEVICE AND OPERATION METHOD THEREOF

(71) Applicant: SAMSUNG ELECTRONICS CO., LTD., Suwon-si (KR)

(72) Inventors: Yunho Lee, Suwon-si (KR); Yonghoon Park, Suwon-si (KR); Hyeyoung Chang, Suwon-si (KR); Kwansik Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 111 days.

(21) Appl. No.: 16/959,024

(22) PCT Filed: Jan. 28, 2019

(86) PCT No.: PCT/KR2019/001172
§ 371 (c)(1),
(2) Date: Jun. 29, 2020

(87) PCT Pub. No.: WO2019/156408
PCT Pub. Date: Aug. 15, 2019

(65) Prior Publication Data
US 2020/0336676 A1    Oct. 22, 2020

(30) Foreign Application Priority Data
Feb. 12, 2018   (KR) .................. 10-2018-0017062

(51) Int. Cl.
*H04N 5/225* (2006.01)
*H04N 9/04* (2006.01)
(Continued)

(52) U.S. Cl.
CPC ......... *H04N 5/232945* (2018.08); *G06T 7/70* (2017.01); *H04N 5/232935* (2018.08);
(Continued)

(58) Field of Classification Search
CPC ....... H04N 5/232945; H04N 5/232935; H04N 5/23222; H04N 21/4126; H04N 21/4312;
(Continued)

(56) References Cited

U.S. PATENT DOCUMENTS

| 10,191,709 B2 | 1/2019 | Seo et al. | |
| 10,467,933 B2 | 11/2019 | Hur et al. | |
| 10,785,440 B2 | 9/2020 | Park et al. | |
| 2011/0187731 A1* | 8/2011 | Tsuchida | H04N 21/8583 345/581 |

(Continued)

FOREIGN PATENT DOCUMENTS

| CN | 103685729 A | 3/2014 |
| EP | 2570986 A1 | 3/2013 |

(Continued)

OTHER PUBLICATIONS

Communication dated Apr. 25, 2021 by the Korean Intellectual Property Office in Korean Patent Application No. 10-2018-0017062.
(Continued)

*Primary Examiner* — Stephen P Coleman
(74) *Attorney, Agent, or Firm* — Sughrue Mion, PLLC

(57) ABSTRACT

An electronic device and an operating method thereof are disclosed according to embodiments. An electronic device according to an embodiment includes: a camera; a display; a communication interface; a memory for storing one or more instructions; and a processor that executes the one or more instructions stored in the memory, the processor being configured to: generate an event instructing to display one or more markers on a screen of a display device and transmit the event to the display device; control the camera to capture an image of at least a portion of a wall around the display device using the one or more markers displayed on the screen of the display device according to the generated (Continued)

event; generate a background image to be displayed on the screen of the display device based on the obtained image; and transmit the generated background image to the display device such that the generated background image is displayed on the screen of the display device.

13 Claims, 23 Drawing Sheets

(51) Int. Cl.
    *H04N 5/232*     (2006.01)
    *G06T 7/70*     (2017.01)
    *H04N 21/41*     (2011.01)

(52) U.S. Cl.
    CPC ............ *H04N 21/4112* (2020.08); *G06T 2207/20212* (2013.01); *G06T 2207/30204* (2013.01)

(58) Field of Classification Search
    CPC ........... H04N 21/4854; H04N 21/4223; H04N 5/232; H04N 21/4104; H04N 21/485; H04N 21/8153; H04N 5/272; H04N 5/23206; H04N 5/232939; H04N 21/4222; G06T 7/70; G06T 2207/20212; G06T 2207/30204
    USPC .................................................... 348/207.99
    See application file for complete search history.

(56) References Cited

U.S. PATENT DOCUMENTS

| 2013/0081083 | A1* | 3/2013 | Yu ................... H04N 21/44227 725/40 |
|---|---|---|---|
| 2014/0313117 | A1 | 10/2014 | Addy et al. |
| 2015/0022551 | A1 | 1/2015 | Kim et al. |
| 2018/0350281 | A1* | 12/2018 | Hur .......................... G09G 5/10 |

FOREIGN PATENT DOCUMENTS

| EP | 3316570 A1 | 5/2018 |
|---|---|---|
| ER | 3337161 A1 | 6/2018 |
| KR | 10-1429812 B1 | 8/2014 |
| KR | 10-2015-0010432 A | 1/2015 |
| KR | 10-2015-0088085 A | 7/2015 |
| KR | 10-2016-0078083 A | 7/2016 |
| KR | 10-2017-0028810 A | 3/2017 |
| KR | 10-1810479 B1 | 12/2017 |
| WO | 2017078356 A1 | 5/2017 |

OTHER PUBLICATIONS

Communication dated Sep. 2, 2020 issued by the European Patent Office in European Application No. 19750779.1.
International Search Report and Written Opinion (PCT/ISA/210 and PCT/ISA/237) dated May 1, 2019, issued by International Searching Authority in International Application No. PCT/KR2019/001172.
Communication dated May 11, 2022, issued by the China National Intellectual Property Administration in Chinese Application No. 201980012792.5.

* cited by examiner

FIG. 2
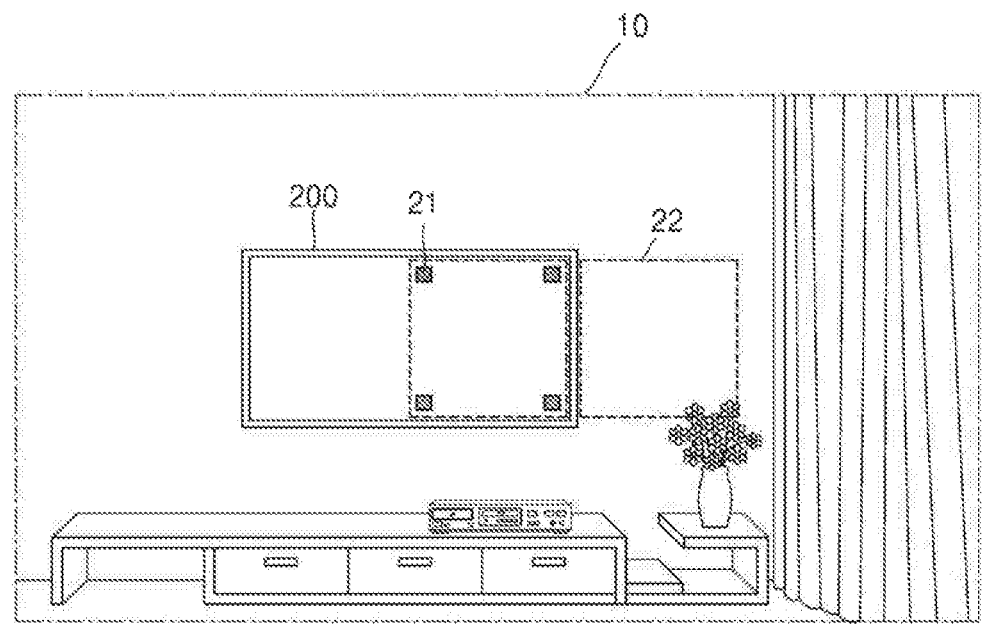
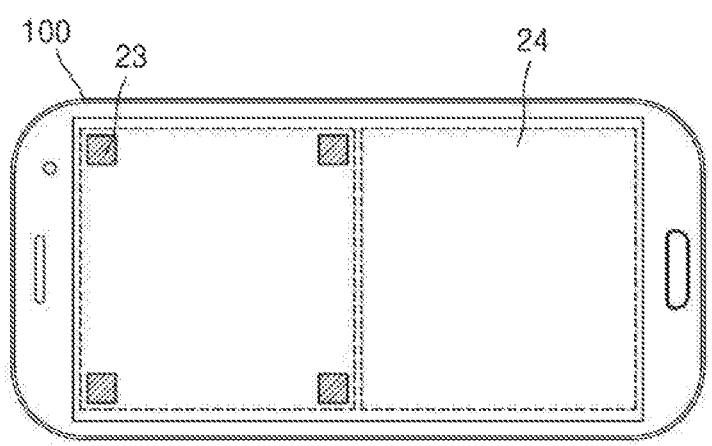

FIG. 10
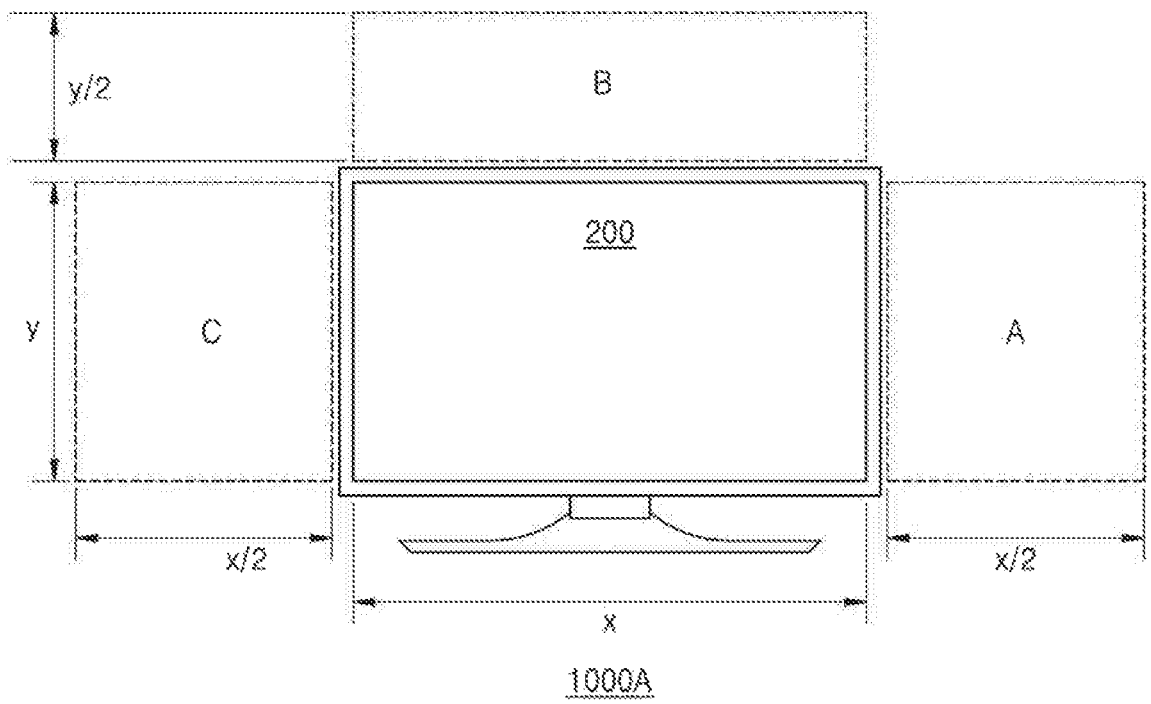
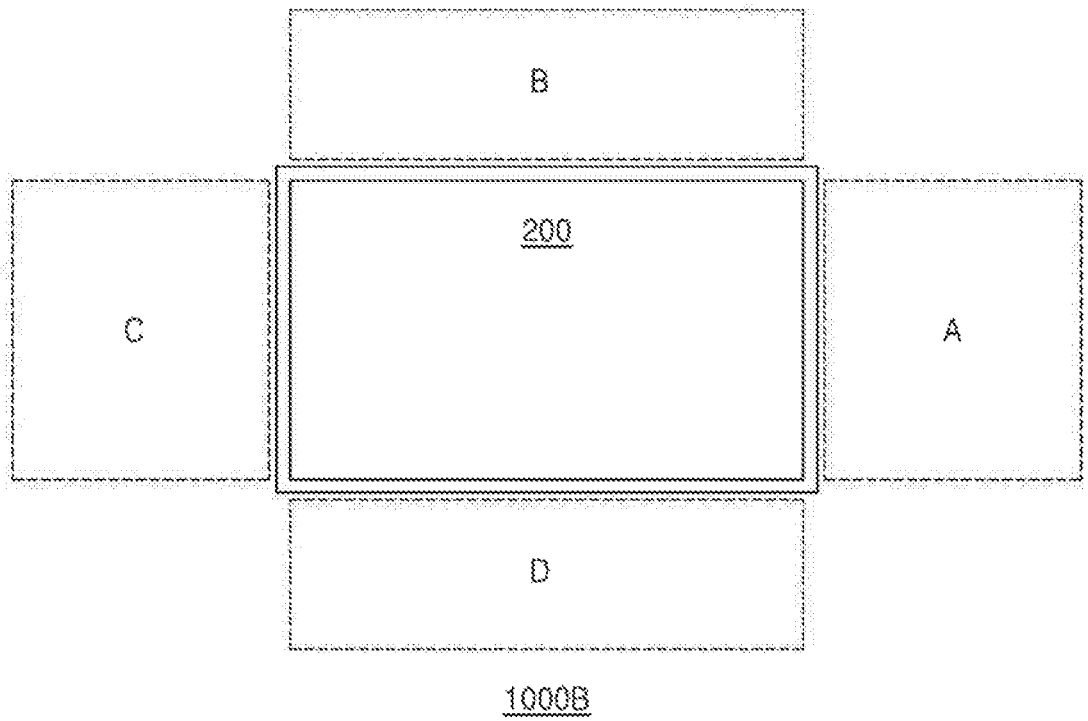

FIG. 11
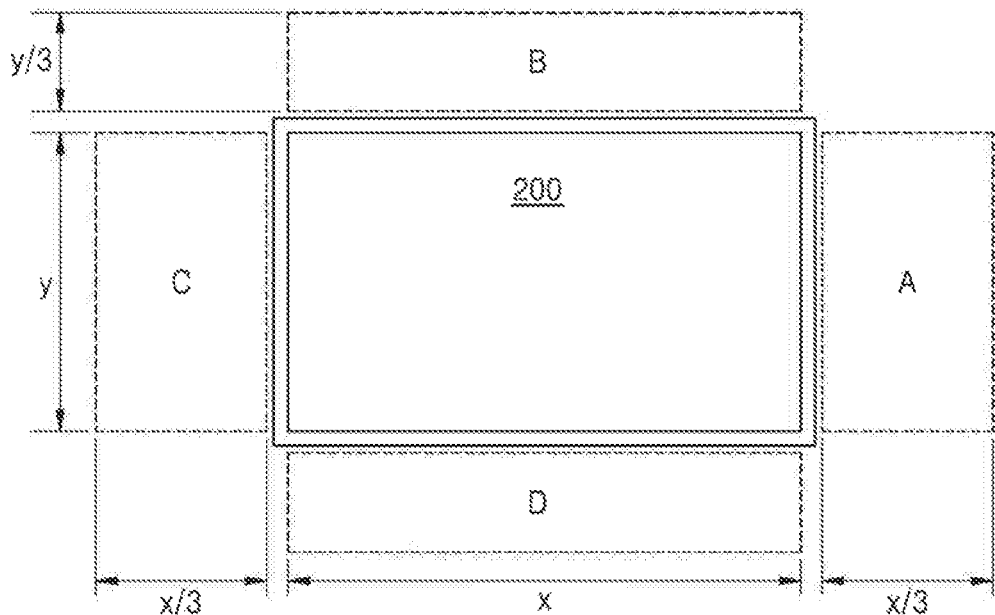
1100A
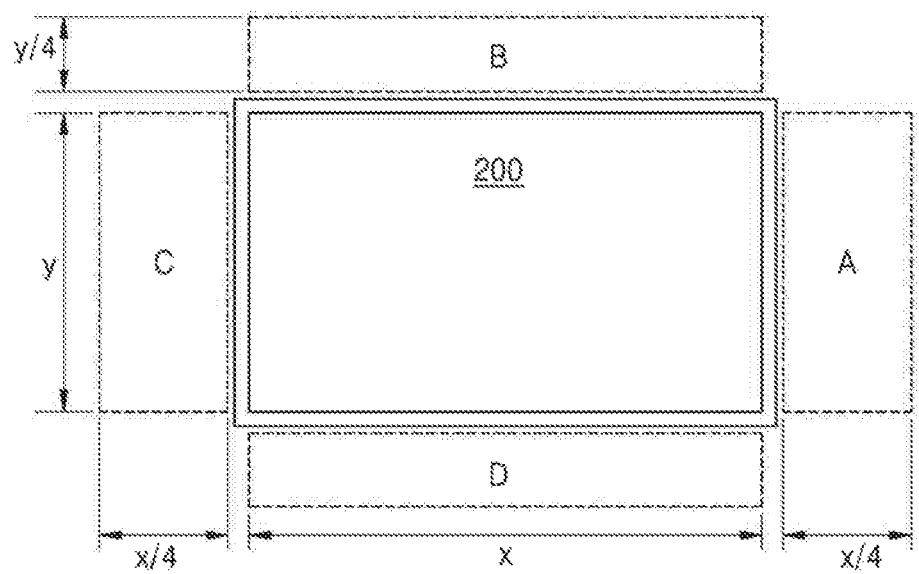
1100B

FIG. 13
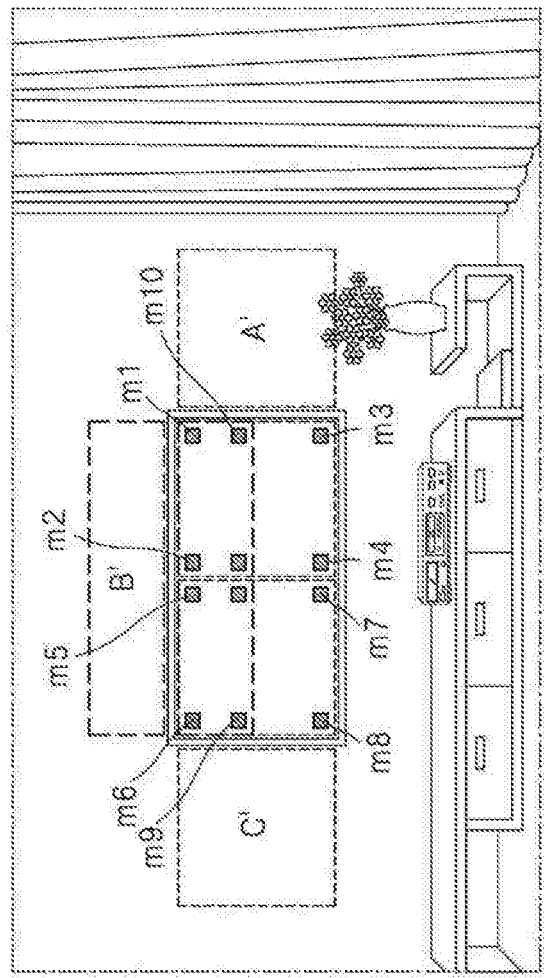
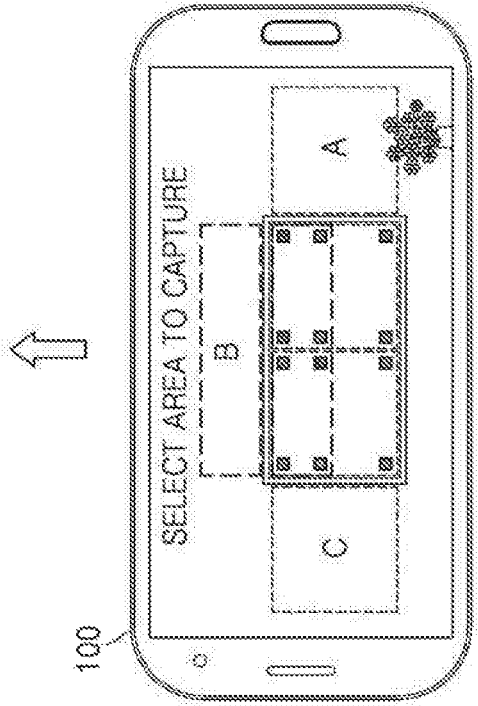

FIG. 21
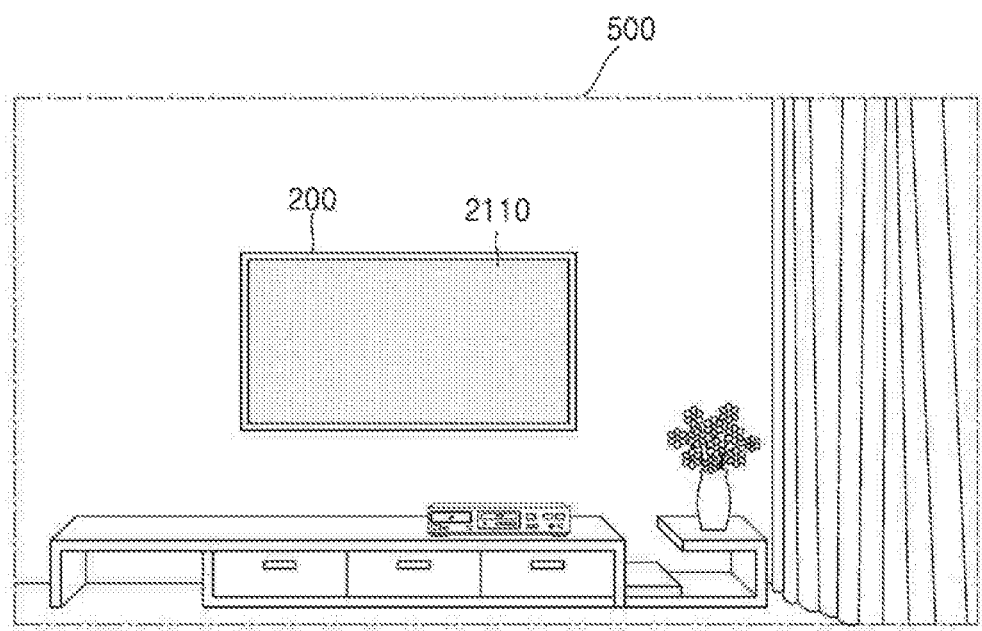
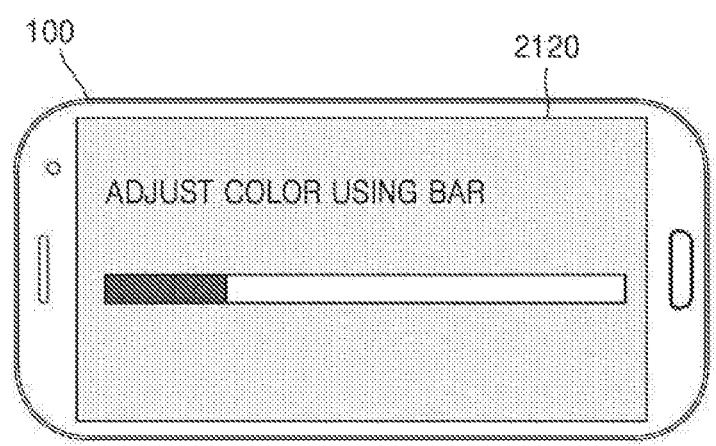

ELECTRONIC DEVICE AND OPERATION METHOD THEREOF

TECHNICAL FIELD

Various embodiments relate to an electronic device and an operation method thereof, and more particularly, to an electronic device and a method of operating the electronic device to display an image of a wall on a display device.

BACKGROUND ART

An image display device is a device having a function of displaying an image that a user can view. The user can view a broadcast through the image display device. The image display device displays a broadcast, which is selected by the user from among broadcast signals transmitted from a broadcast station, on a display. Currently, broadcasting has been changed worldwide from analog broadcasting to digital broadcasting.

Digital broadcasting refers to broadcasting digital images and audio signals. Compared with analog broadcasting, digital broadcasting is strong against external noise and has small data loss, is advantageous for error correction, has high resolution, and provides clear images. Also, unlike analog broadcasting, digital broadcasting can provide a bidirectional service.

Provided is a smart television providing various pieces of content in addition to a broadcasting function. The smart television is capable of analyzing and providing what a user desires without a user's operation, rather than being manually operated according to a user's selection.

In addition, recently, a product such as a wall-mounted television installed on a wall or a framed television for giving an aesthetic sense such as a picture frame has been provided to enhance the interior decoration of an environment in which the television is installed.

DESCRIPTION OF EMBODIMENTS

Technical Problem

Various embodiments are intended to provide a method and a device for displaying a wall image on a television screen to enhance an aesthetic sense of an environment in which a television is installed.

Solution to Problem

To solve this technical problem, an electronic device and an operation method thereof control a display device to display one or more markers on a screen of the display device in order to naturally display an image of a wall around the display device on the screen of the display device, capture the image of the wall around the display device using the displayed markers, and generate a background image to be displayed on the screen of the display device using the captured image.

Advantageous Effects of Disclosure

When a display device is installed according to embodiments, an image on a wall may be captured and processed more effectively to generate a background image to be displayed on the display device, thereby increasing an aesthetic sense of an environment in which the display device is installed.

BRIEF DESCRIPTION OF DRAWINGS

FIG. 2 is a reference diagram for describing a method of displaying a wall image on a display device, according to an embodiment.

FIG. 10 is a view illustrating an area to be captured among peripheral walls of a display device, according to an embodiment.

FIG. 11 is a reference diagram for describing a size of a peripheral wall area of a display device to be captured, according to an embodiment.

FIG. 13 is a view for explaining a method of determining a marker display position according to a selected captured area, according to an embodiment.

FIG. 21 illustrates an example of checking a background image displayed on the display device 200 and changing a color of the background image by a user through the mobile device 100, according to an embodiment.

BEST MODE

Figure 1:
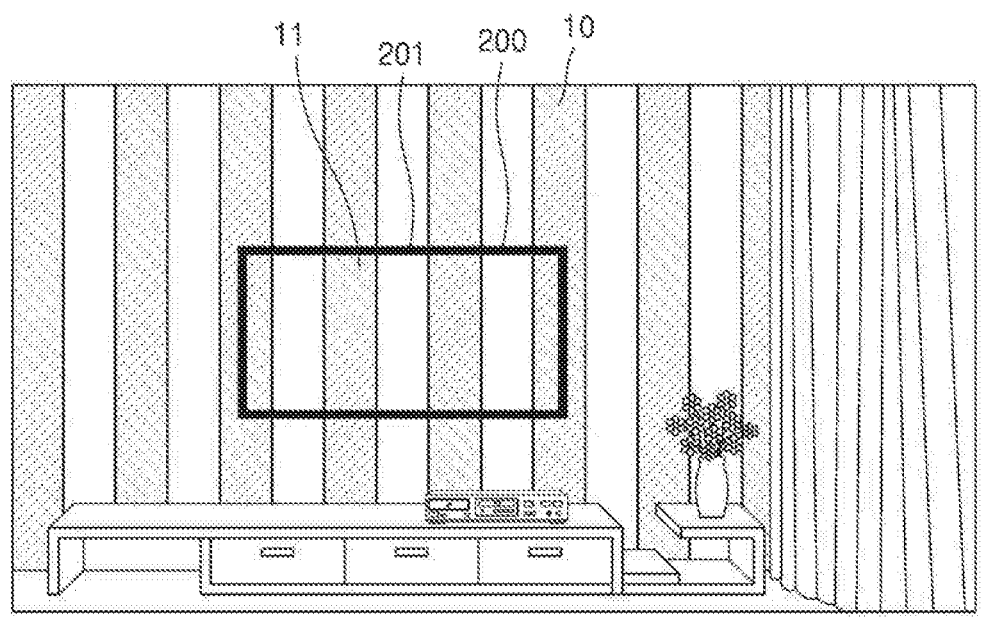
FIG. 1 is a reference diagram for describing a concept of displaying a wall image on a display device, according to embodiments.

An electronic device according to an embodiment includes: a camera; a display; a communication interface; a memory for storing one or more instructions; and a processor that executes the one or more instructions stored in the memory, the processor configured to: generate an event instructing to display one or more markers on a screen of a display device and transmit the event to the display device; control the camera to capture an image of at least a portion of a wall around the display device using the one or more markers displayed on the screen of the display device according to the generated event; generate a background image to be displayed on the screen of the display device based on the obtained image; and transmit the generated background image to the display device such that the generated background image is displayed on the screen of the display device.

According to an embodiment, the processor is configured to execute the instructions to: obtain size information about the screen of the display device; and determine a position on which the one or more markers will be displayed on the screen of the display device based on the obtained size information and generate the event including information about the determined marker display position.

According to an embodiment, the processor is configured to execute the instructions to: control the camera to capture an image of at least a portion of the wall around the display device using the one or more markers displayed on the screen of the display device and a preview image displayed on the display.

According to an embodiment, the processor is configured to execute the instructions to: control the display to display the preview image including one or more guides in consideration of a position of at least a portion of a wall to be captured; and control the camera to capture an image of at least a portion of the wall as the one or more guides included in the preview image are positioned on the one or more markers displayed on the screen of the display device.

According to an embodiment, at least a partial area of a wall on which the display device is installed may include at least one of a left area, a right area, an upper area, and a lower area of a wall adjacent to the display device.

According to an embodiment, the processor is configured to execute the instructions to: generate a background image by combining one or more copies of the obtained image and one or more copies of a symmetric image of the obtained image.

According to an embodiment, the processor is configured to execute the instructions to: generate a background image by combining the obtained image with a symmetric image of the obtained image when the size of the obtained image is half the size of the background image.

According to an embodiment, the processor is configured to execute the instructions to: when the obtained image is an image obtained from a left area or a right area of a wall adjacent to the display device, the processor, obtain the symmetric image by symmetrically arranging the obtained image in the left or right direction of the obtained image; and when the obtained image is an image obtained from an upper area or a lower area of the wall adjacent to the display device, obtain the symmetric image by symmetrically arranging the obtained image in the upper or lower direction of the obtained image.

According to an embodiment, the processor is configured to execute the instructions to: transmit a marker display event and a background image to the display device through a server.

According to an embodiment, the processor is configured to execute the instructions to: control the camera to obtain the background image which is displayed on a screen of the display device and a peripheral area of the display device; adjust an attribute of the background image displayed on the screen using an attribute of the peripheral area; and transmit the background image with the adjusted attribute to the display device.

A method of operating an electronic device according to an embodiment includes: generating an event instructing to display one or more markers on a screen of a display device and transmitting the event to the display device; capturing an image of at least a portion of a wall around the display device using the one or more markers displayed on the screen of the display device according to the generated event; generating a background image to be displayed on the screen of the display device based on the obtained image; and transmitting the generated background image to the display device such that the generated background image is displayed on the screen of the display device.

According to an embodiment, disclosed is a non-transitory computer-readable recording medium having recorded thereon a program for executing a method of operating a display device in a computer.

MODE OF DISCLOSURE

Terms used in the present specification will be briefly described, and the present inventive concept will be described in detail.

General and widely used terms have been employed herein, in consideration of functions provided in the disclosure, and may vary according to an intention of one of ordinary skill in the art, a precedent, or emergence of new technologies. Additionally, in some cases, an applicant may arbitrarily select specific terms, in which case, the applicant will provide the meaning of the terms in the description of the embodiments. Accordingly, it will be understood that the terms used herein should be interpreted as having a meaning that is consistent with their meaning in the context of the relevant art and will not be interpreted in an idealized or overly formal sense unless expressly so defined herein.

Throughout the specification, when a portion "includes" an element, another element may be further included, rather than excluding the existence of the other element, unless otherwise described. In addition, terms such as " . . . unit", " . . . module", or the like refer to units that perform at least one function or operation, and the units may be implemented as hardware or software or as a combination of hardware and software.

The disclosed example embodiments will be described with reference to the accompanying drawings in such a manner that the example embodiments may be easily carried out by those of ordinary skill in the art. In this regard, the present disclosure may have different forms and should not be construed as being limited to the descriptions set forth herein. In addition, descriptions of well-known functions and constructions will be omitted for clarity and conciseness, and similar reference numerals are assigned to similar elements throughout the specification.

In embodiments of the specification, the term "user" refers to a person who controls functions or operations of an image display device using a control device, and may include a viewer, a manager, or an installer.

FIG. 1 is a reference diagram for describing a concept of displaying a wall image on a display device, according to embodiments.

Referring to FIG. 1, a display device 200 is installed on a wall 10. The display device 200 according to an embodiment may display an image 11 of a portion of the wall 10 in a state other than a normal operation mode of the display device 200 that displays content according to a user input. In a state in which a user does not use the display device 200 by operating the same, the display device 200 may display the image 11 of a portion of the wall 10 to increase an aesthetic sense of an environment in which the display device 200 is installed. In addition, by making a bezel 201 of the display device 200 slimmer or by implementing the bezel 201 in a color not recognized by human eyes, it is possible to provide a user with an experience as if the display device 200 is not on the wall image 11 while the display device 200 is not operating. A TV providing such an effect may be referred to as a glass TV.

As such, when the display device 200 displays the wall image 11, the more the real wall 10 and the wall image 11 are expressed so that they may be naturally connected, a user may experience the display device 200 as if it were a wall. After the display device 200 is installed on the wall 10, it is difficult to identify a portion of the wall 10 covered by the display device 200. Therefore, it is important to express the wall image 11 displayed by the display device 200 in a state where the display device 200 is installed on the wall 10 so as to be connected to a peripheral area of the display device 200 as naturally as possible.

FIG. 2 is a reference diagram for describing a method of displaying a wall image on a display device, according to an embodiment.

Referring to FIG. 2, the display device 200 installed on the wall 10 may display at least one marker 21. The display device 200 may display a marker according to a request from a mobile device 100. The display device 200 may display a marker by receiving information about one of a display position of the marker, that is, one of the right, left, top, and bottom of a screen from the mobile device 100. FIG. 2 corresponds to a case in which a request to display a marker on the right side of the screen is received from the mobile device 100.

The mobile device 100 may provide the display device 200 with the information about the display position of the marker to the display device 200. In the case of FIG. 2, the mobile device 100 provides a request to display the marker 21 on the right area on the display device 200. At this time, in order to capture a right wall image of the display device 200, the mobile device may display a guide 23 on the left area of the screen of the mobile device 100.

The mobile device 100 may receive a selection from a user as to which area of peripheral walls of the display device 200 is to be captured. For example, when a user selects a right wall area as an area to be captured among the peripheral walls of the display device 200, the mobile device 100 may transmit information to the display device 200 to display the marker 21 on the right side of a screen of the display device so as to capture the right wall area of the display device. In addition, the guide 23 for matching with a marker displayed on the display device 200 may be displayed on the left side of the screen of the mobile device 100.

The mobile device 100 may display one or more guides on a display of the mobile device 100. The mobile device 100 may capture an image of a portion of the wall 10 using at least one guide 23 and at least one marker 21 displayed on the display device 200. For example, when a user moves the mobile device 100 so that the guide 23 of the mobile device 100 is positioned at the marker 21 displayed on the display device 200, the mobile device 100 may capture a wall image 22. When the guide 23 is positioned at the marker 21, because the mobile device 100 receives an image of a right peripheral area 22 of the display device 200 in a right portion 24 of an area captured by the mobile device 100, the mobile device 100 may capture the right peripheral area 22 of the wall 10. Because the area 22 is a right peripheral area of the display device 200, the mobile device 100 may generate a wall image to be displayed on the display device 200, that is, a background image, by performing appropriate processing using an image of the captured area 22. In addition, because the area 22 is an area immediately adjacent to the display device 200, when a background image to be displayed on the display device 200 is generated using the image of the area 22, an image that appears to be more naturally connected to the peripheral area of the display device 200 may be generated.

In FIG. 2, the right area 22 of the display device 200 to be captured is an example, and the captured area may be any position of the left area, the upper area, and the lower area of the display device 200.

Figure 3:
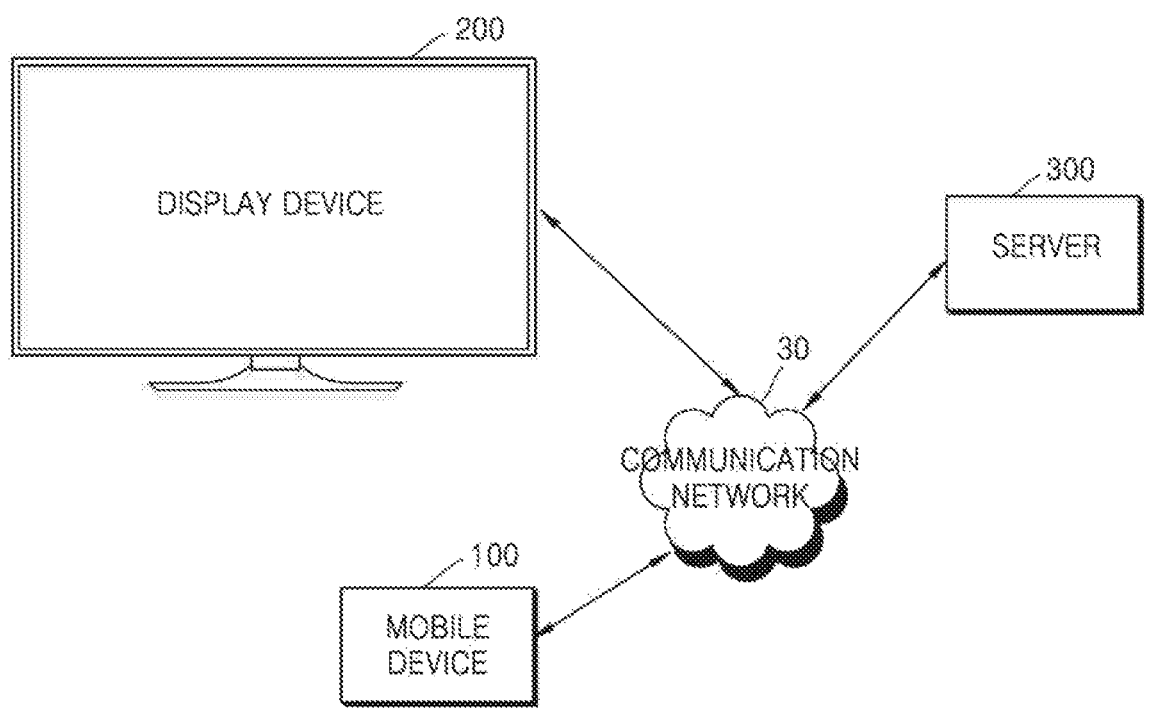
FIG. 3 is a schematic view for describing an example of a system for displaying an image of a wall on a display device, according to embodiments.

FIG. 3 is a schematic view for describing an example of a system for displaying a wall image on a display device, according to embodiments.

Referring to FIG. 3, according to an embodiment, the system may include the mobile device 100, the display device 200, and a server 300. The mobile device 100, the display device 200, and the server 300 may communicate with each other through a communication network 30. The communication network 30 may include a broadband network according to various communication standards such as Zigbee, 3rd Generation (3G), 3rd Generation Partnership Project (3GPP), and Long Term Evolution (LTE).

The mobile device 100 may receive information about the display device 200 from the display device 200 or the server 300 through the server 300, specifically screen size information, and may generate a marker display event based on the information.

The marker display event is transmitted to the display device 200 through the server 300, and when the marker display event is received, the display device 200 may display one or more markers on a screen. The markers may be displayed at various positions on the screen of the display device 200.

The mobile device 100 may capture an image of a wall around the display device 200 using a marker displayed on the display device 200. The mobile device 100 may capture an image of an area around the display device 200 according to a position of the marker displayed on the screen of the display device 200. For example, when a marker is displayed on the left half screen of the display device 200, the mobile device 100 may capture an image on an area adjacent to the left side of the display device 200.

The mobile device 100 may generate a background image to be displayed on the display device 200 by using the captured original image and a symmetric image that mirrors the original image, and may transmit the generated background image to the display device 200 through the server 300.

When the background image is received through the server 300, the display device 200 may display the background image on the screen.

Figure 4:
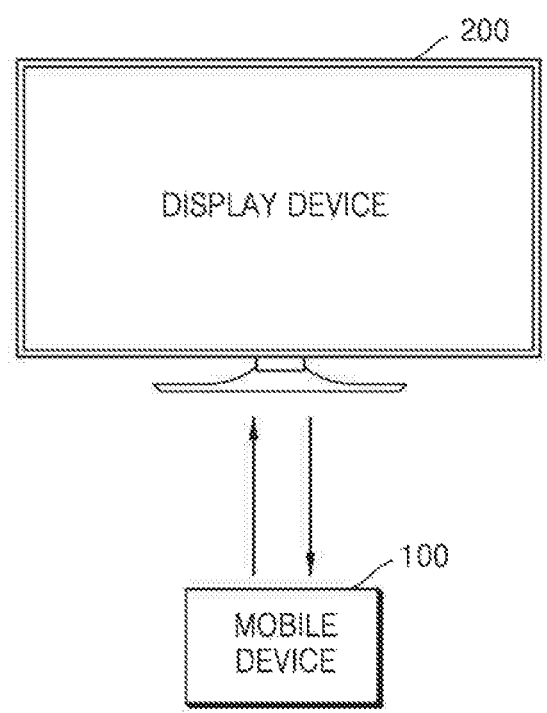
FIG. 4 is a schematic view for describing another example of a system for displaying an image of a wall on a display device, according to embodiments.

FIG. 4 is a schematic view for describing another example of a system for displaying a wall image on a display device, according to embodiments.

Referring to FIG. 4, according to an embodiment, the system may include the mobile device 100 and the display device 200. The mobile device 100 and the display device 200 may communicate with each other through a short-range communication method. The short-range communication method may use short-range communication protocols such as Bluetooth, Bluetooth low energy (BLE), Wi-Fi, Wi-Fi Direct, Near Field Communication (NFC), infrared communication, and laser beam communication.

Because the mobile device 100 does not go through the server, the mobile device 100 may receive screen information about the display device 200 directly from the display device 200 and may directly transmit a marker display event generated thereby to the display device 200.

The display device 200 displays at least one marker on the screen according to the marker display event, and the mobile device 100 may capture a peripheral wall image of the display device 200 using a marker displayed on the screen of the display device 200, may generate a background image using the captured image, and may transmit the generated background image to the display device 200.

The display device 200 may receive the background image and display the same on the screen.

Figure 5:
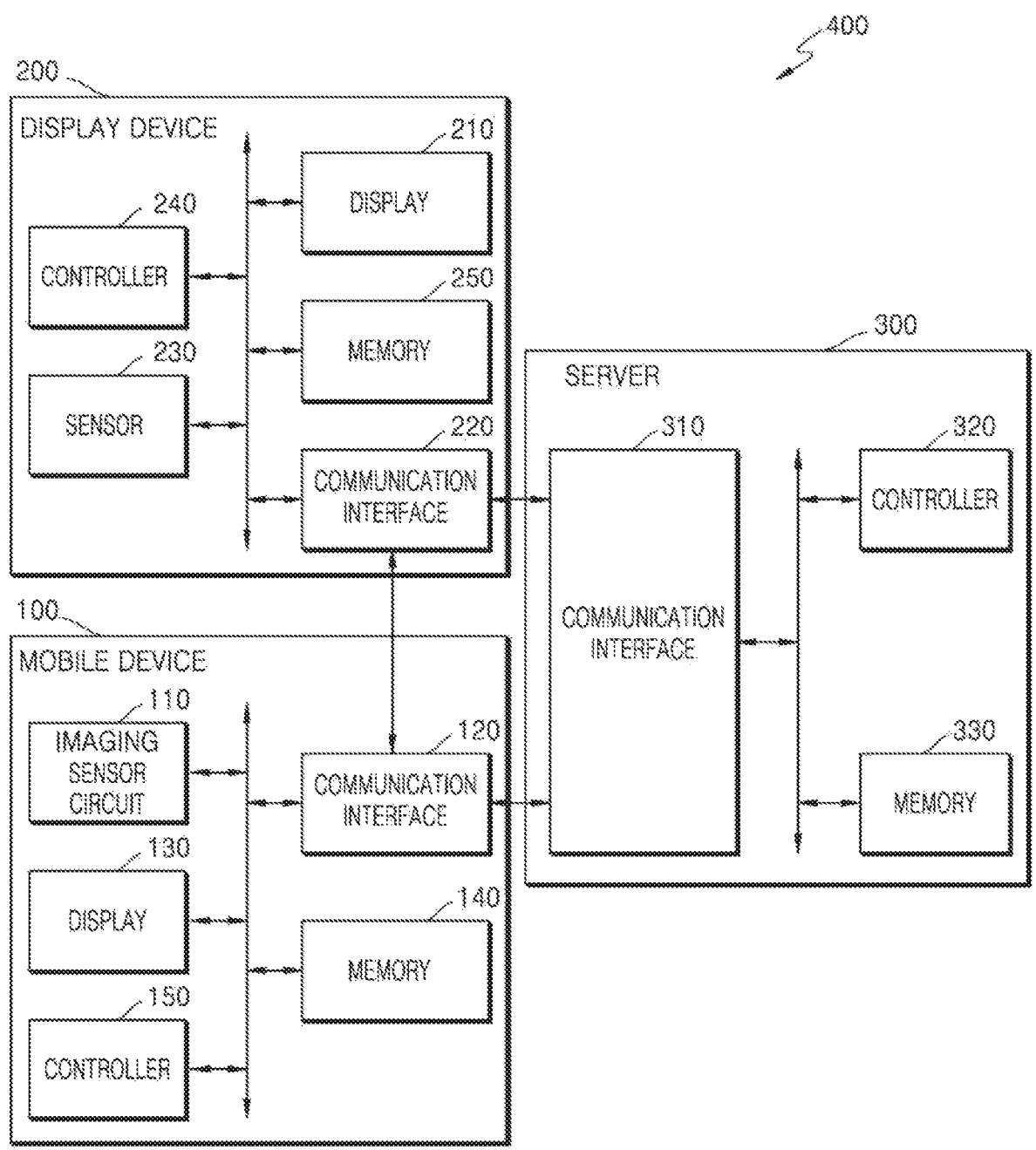
FIG. 5 is a block diagram of a mobile device 100, a display device 200, and a server 300 according to an embodiment.

FIG. 5 is a block diagram of the mobile device 100, the display device 200, and the server 300 according to an embodiment.

The display device 200 may display an image by processing content data received through various sources. The display device 200 may receive an RF signal from a broadcasting station using an RF antenna. The display device 200 may receive content provided by a content providing server through a communication network based on the Internet protocol. The display device 200 may receive content from external devices connected to the display device 200 through various ports or HDMI. The external devices may include, for example, set-top boxes, game consoles, BD players, PCs, USBs, and the like. In addition, the display device 200 may receive content from a mobile device that is connected and communicates with the display device 200, and may also obtain content data from a memory that is self-contained or locally connected.

The display device 200 may include a display 210, a communication interface 220, a sensor 230, and a controller 240.

The display 210 displays content received through various sources on a screen under the control of the controller 240. The various sources may include, for example, the communication interface 220, a memory 250, and an input/output unit. The display 210 may be implemented as PDP, LCD, OLED, a flexible display, or the like, and may also be implemented as a three-dimensional (3D) display. Also, the display 130 may be configured as a touch screen and used as an input device in addition to an output device.

The communication interface 220 may connect the display device 200 to an external device, for example, the mobile device 100 or the server 300, under the control of the controller 240. The communication interface 220 may include one or a combination of wireless LAN, Bluetooth, and wired Ethernet according to the performance and structure of the display device. The communication interface 220 may further include short-range communication other than Bluetooth, for example, near field communication (NFC) and Bluetooth low energy (BLE).

The sensor 230 may include a microphone that detects a user's voice, a user's video, or user's interaction, and receives a user's uttered voice, a camera unit capable of receiving an image corresponding to a user's motion including a gesture in a camera recognition range, and an optical receiver receiving an optical signal (including a control signal) received from an external remote control device according to a user input. The sensor 230 detects a command or a control signal from the remote control device through the optical receiver, and transmits the detected command or control signal to the controller 240. The remote control device may be implemented as various types of devices for controlling the display device 200 such as a remote controller or a mobile phone.

The memory 250 may store various data, programs, or applications for driving and controlling the display device 200 under the control of the controller 240. The memory 250 may store an operating system for controlling the display device 200 and the controller, an application initially provided from a manufacturer or downloaded from outside, a graphical user interface (GUI) related to the application, objects (e.g., images, texts, icons, buttons, etc.) for providing the GUI, user information, documents, databases, or related data.

The memory 250 includes a memory card (e.g., a micro SD card, a USB memory; not shown) mounted in ROM, RAM, or the display device 200. In addition, the memory 200 may include a nonvolatile memory, a volatile memory, a hard disk drive (HDD), or a solid state drive (SSD).

In particular, according to an embodiment, the memory 250 may include one or more instructions for transmitting information about the display device 200 at a request of the mobile device 100 or the server 300. The information about the display device 200 may include size information of the display device 200, specifically screen size information.

According to an embodiment, the memory 250 may include one or more instructions for receiving a marker display event from the mobile device 100 or the server 300 and displaying one or more markers on the display according to the marker display event.

According to an embodiment, the memory 250 may include one or more instructions for receiving a background image from the mobile device 100 or the server 300 and displaying the background image on the display. The background image may include an image generated using a peripheral area of a wall on which the display device 200 is installed.

The controller 240 controls all operations of the display device 200 and a signal flow between internal components of the display device 200 and performs data processing. The controller 240 may execute an operating system (OS) and various applications stored in the memory 250 when the controller 240 receives a user input or satisfies conditions already set and stored.

A processor used in the controller 240 may include a graphics processing unit (GPU) (not shown) for graphics processing corresponding to a video. The processor may be implemented as a System On Chip (SaC) integrating a core (not shown) and the GPU (not shown). The processor may include a single core, a dual core, a triple core, a quad core, and multiples thereof.

In addition, the processor may include a plurality of processors. For example, the processor may be implemented as a main processor (not shown) and a sub processor (not shown) operating in a sleep mode.

The controller 240 according to an embodiment may transmit information about the display device 200 according to the request of the mobile device 100 or the server 300 by executing one or more instructions stored in the memory 250.

The controller 240 according to an embodiment may receive a marker display event from the mobile device 100 or the server 300 by executing one or more instructions stored in the memory 250, and may display one or more markers on the display according to the marker display event.

The controller 240 according to an embodiment may receive a background image from the mobile device 100 or the server 300 by executing one or more instructions stored in the memory 250, and may display the background image on the display.

The display device 200 may further include an input/output unit that receives video (e.g., a moving picture, etc.), audio (e.g., voice, music, etc.), and additional information (e.g., an EPG, etc.) from the outside of the display device 200 under control of the controller 240. The input/output unit may include one or a combination of a High-Definition Multimedia Interface (HDMI) port, a component jack, a PC port, and a USB port. The display device 200 according to an embodiment may be a TV, but this is only an embodiment and may be implemented as an electronic device including a display. For example, the display device 200 may be implemented as various electronic devices such as a desktop computer or a digital broadcasting terminal. The display device 200 may be a flat display device, a curved display device having a curved screen, or a flexible display with adjustable curvature.

Furthermore, the display device 200 may be electrically connected to a separate external device (e.g., a set-top box, not shown) having a tuner. For example, the display device 200 may be implemented as an analog TV, a digital TV, a 3D TV, a smart TV, an LED TV, an OLED TV, a plasma TV, a monitor, or the like, but is not limited thereto.

Meanwhile, the block diagram of the illustrated display device 200 is a block diagram for an embodiment. Each component of the block diagram may be integrated, added, or omitted depending on the specification of the actual display device 200. Each component of the block diagram may be integrated, added, or omitted, depending on specifications of the image display device 200 that is actually implemented. For example, if necessary, two or more components may be combined into one component, or one component may be divided into two or more components. In addition, the functions performed by the respective blocks are for purposes of describing the embodiments, that the specific operation and the device shall not limit the scope of the present disclosure.

The server 300 is a computing device in which a server program providing a service is executed at the request of a user (client).

The server 300 may include a communication interface 310 and a controller 320.

The communication interface 310 may connect the server 300 to an external device, for example, the mobile device 100 or the display device 200, under the control of the controller 320. The communication interface 220 may include one or a combination of wireless LAN, Bluetooth, and wired Ethernet according to the performance and structure of the display device.

The memory 330 may store various data, programs, or applications for driving and controlling the server 300 under the control of the controller 320. The memory 330 may store an operating system for controlling the server 300 and the controller, an application initially provided from a manufacturer or downloaded from outside, a graphical user interface (GUI) related to the application, objects (e.g., images, texts, icons, buttons, etc.) for providing the GUI, user information, documents, databases, or related data.

The memory 330 includes a memory card (e.g., a micro SD card or a USB memory; not shown) mounted in ROM, RAM, or the server 300. In addition, the memory 330 may include a nonvolatile memory, a volatile memory, a hard disk drive (HDD), or a solid state drive (SSD).

In particular, according to an embodiment, the memory 330 may include one or more instructions for transmitting an application for controlling one or more devices in the home to the mobile device 100 at the request of the mobile device 100. A device control application may be used to control the display device 200, and particularly, may include one or more instructions for setting a background image of the display device 200.

According to an embodiment, the memory 330 may include one or more instructions for transmitting information about the display device 200 at the request of the mobile device 100. The information about the display device 200 may include size information of the display device 200, specifically screen size information.

According to an embodiment, the memory 330 may include one or more instructions for receiving a marker display event from the mobile device 100 and transmitting the marker display event to the display device 200.

According to an embodiment, the memory 330 may include one or more instructions for receiving a background image from the mobile device 100 and transmitting the background image to the display device 200. The background image may include an image generated using a peripheral area of a wall on which the display device 200 is installed.

The controller 410 controls all operations of the server 300 and a signal flow between internal components of the server 300 and performs data processing. The controller 320 may execute an operating system (OS) and various applications stored in the memory 250 when the controller 320 receives a user input or satisfies conditions already set and stored.

A processor used in the controller 320 may include a graphics processing unit (GPU) (not shown) for graphics processing corresponding to a video. The processor may be implemented as a System On Chip (SoC) integrating a core (not shown) and the GPU (not shown). The processor may include a single core, a dual core, a triple core, a quad core, and multiples thereof.

In addition, the processor may include a plurality of processors. For example, the processor may be implemented as a main processor (not shown) and a sub processor (not shown) operating in a sleep mode.

The memory 330 according to an embodiment may transmit an application for controlling one or more devices in the home to the mobile device 100 by executing one or more instructions stored in the memory 330. The device control application may be used to control the display device 200, and particularly, may include one or more instructions for setting the background image of the display device 200.

The controller 320 according to an embodiment may transmit information about the display device 200 according to the request of the mobile device 100 by executing one or more instructions stored in the memory 330. The information about the display device 200 may include size information of the display device 200, specifically screen size information.

The controller 320 according to an embodiment may receive a marker display event from the mobile device 100 by executing one or more instructions stored in the memory 330, and may transmit the marker display event to the display device 200.

The controller 320 according to an embodiment may receive a background image from the mobile device 100 by executing one or more instructions stored in the memory 330, and may transmit the background image to the display device 200. The background image may include an image generated using a peripheral area of a wall on which the display device 200 is installed.

The mobile device 100 may capture an image of a wall on which the display device 200 is installed, may generate a background image to be displayed on a screen of the display device 200 based on the captured image, and then may transmit the background image to the display device 200 through the server 300.

The mobile device 100 may include an imaging sensor circuit 110, a communication interface 120, a display 130, a memory 140, and a controller 150.

The imaging sensor circuit 110 may receive an image (e.g., continuous frames) corresponding to user's motion including a gesture in a recognition range of an imaging sensor. The imaging sensor circuit 110 may be implemented as a camera. The imaging sensor circuit 110 according to an embodiment may capture an image representing a wall to be displayed by the display device 200.

The communication interface 120 may connect the mobile device 100 to an external device, for example, the display device 200 or the server 300, under the control of the controller 150. The communication interface 120 may include one or a combination of wireless LAN, Bluetooth, and wired Ethernet according to the performance and structure of the mobile device. The communication interface 120 may specifically include a mobile communication unit and a sub-communication unit.

The mobile communication unit performs broadband network communication according to various communication standards such as Zigbee, 3rd Generation (3G), 3rd Generation Partnership Project (3GPP), and LTE (Long Term Evolution). The mobile communication unit may be used for communication in the server 300.

The sub-communication unit communicates with peripheral devices using short-range communication protocols such as Bluetooth, Bluetooth low energy (BLE), Wi-Fi, Near Field Communication (NFC), infrared communication, and laser beam communication. The sub-communication unit may be used for communication with the display device 200.

The display 130 displays content received through various sources on a screen under the control of the controller 150. The various sources may include, for example, the communication interface 120, a memory 140, and an input/output unit. Also, the display 130 may be configured as a touch screen and used as an input device in addition to an output device.

The memory 140 may store various data, programs, or applications for driving and controlling the mobile device 100 under the control of the controller 150. The memory 140 may store an operating system for controlling the mobile device 100 and the controller, an application initially provided from a manufacturer or downloaded from outside, a graphical user interface (GUI) related to the application, objects (e.g., images, texts, icons, buttons, etc.) for providing the GUI, user information, documents, databases, or related data.

The memory 140 includes a memory card (e.g., an SD card, a USB memory; not shown) mounted in ROM, RAM, or the mobile device 100.

In particular, according to an embodiment, the memory 140 may include one or more instructions for transmitting a download request of an application for controlling a home device to the server 300, and receiving and storing the device control application accordingly. The device control application may include one or more instructions for controlling the display device 200, particularly one or more instructions used to set the background image of the display device 200.

According to an embodiment, the memory 140 may include one or more instructions for transmitting information about the display device 200 to the mobile device 100 or the server 300. The information about the display device 200 may include size information of the display device 200, specifically screen size information.

According to an embodiment, the memory 140 may include one or more instructions for generating a marker display event using information about the display device 200 and transmitting the marker display event to the mobile device 100 or the server 300. The marker display event may include position information of one or more markers to be displayed on the screen of the display device according to a screen size of the display device 200.

According to an embodiment, the memory 140, according to the marker display event, may include one or more instructions for capturing a partial image of a wall on which the display device 200 is installed using one or more markers displayed on the screen of the display device 200, processing the captured image to generate a background image to be displayed on the screen of the display device 200, and transmitting the background image to the display device 200 or the server 300.

The controller 150 controls all operations of the mobile device 100 and a signal flow between internal components of the mobile device 100 and performs data processing. The controller 150 may execute an operating system (OS) and various applications stored in the memory 140 when the controller 150 receives a user input or satisfies conditions already set and stored.

A processor used in the controller 150 may include a graphics processing unit (GPU) (not shown) for graphics processing corresponding to a video. The processor may be implemented as a System On Chip (SoC) integrating a core (not shown) and the GPU (not shown). The processor may include a single core, a dual core, a triple core, a quad core, and multiples thereof.

In addition, the processor may include a plurality of processors. For example, the processor may be implemented as a main processor (not shown) and a sub processor (not shown) operating in a sleep mode.

The controller 150 according to an embodiment may transmit a request to download an application for controlling a device in the home to the server 300 by executing one or more instructions stored in the memory 140, and may receive and store a device control application accordingly. The device control application may include one or more instructions for controlling the display device 200, particularly one or more instructions used to set the background image of the display device 200.

The controller 150 according to an embodiment may transmit information about the display device 200 to the mobile device 100 or the server 300 by executing one or more instructions stored in the memory 140. The information about the display device 200 may include size information of the display device 200, specifically screen size information.

The controller 150 according to an embodiment, by executing one or more instructions stored in the memory 140, may generate a marker display event using information about the display device 200, and may transmit the marker display event to the mobile device 100 or the server 300. The marker display event may include position information of one or more markers to be displayed on the screen of the display device according to the screen size of the display device 200.

The controller 150 according to an embodiment, by executing one or more instructions stored in the memory 140, may capture a partial image of a wall on which the display device 200 is installed using one or more markers displayed on the screen of the display device 200 according to a marker display event, may process the captured image to generate a background image to be displayed on the screen of the display device 200, and may transmit the background image to the display device 200 or the server 300.

Meanwhile, the block diagram of the illustrated mobile device 100 is a block diagram for an embodiment. Each component of the block diagram may be integrated, added, or omitted depending on the specification of the mobile device 100 that is actually implemented. For example, combining two or more elements are in a single component, as needed, or may be one component configuration is subdivided into two or more components. In addition, the functions performed by the respective blocks are for purposes of describing the embodiments, that the specific operation and the device shall not limit the scope of the present disclosure.

The image mobile device 100 according to an embodiment may be realized as various electronic devices such as a cellular phone, a tablet PC, a digital camera, a camcorder, a laptop computer, an e-book terminal, a terminal for digital broadcasting, a personal digital assistant (PDA), a portable multimedia player (PMP), a navigation, an MP3 player, and an wearable device.

Figure 6:
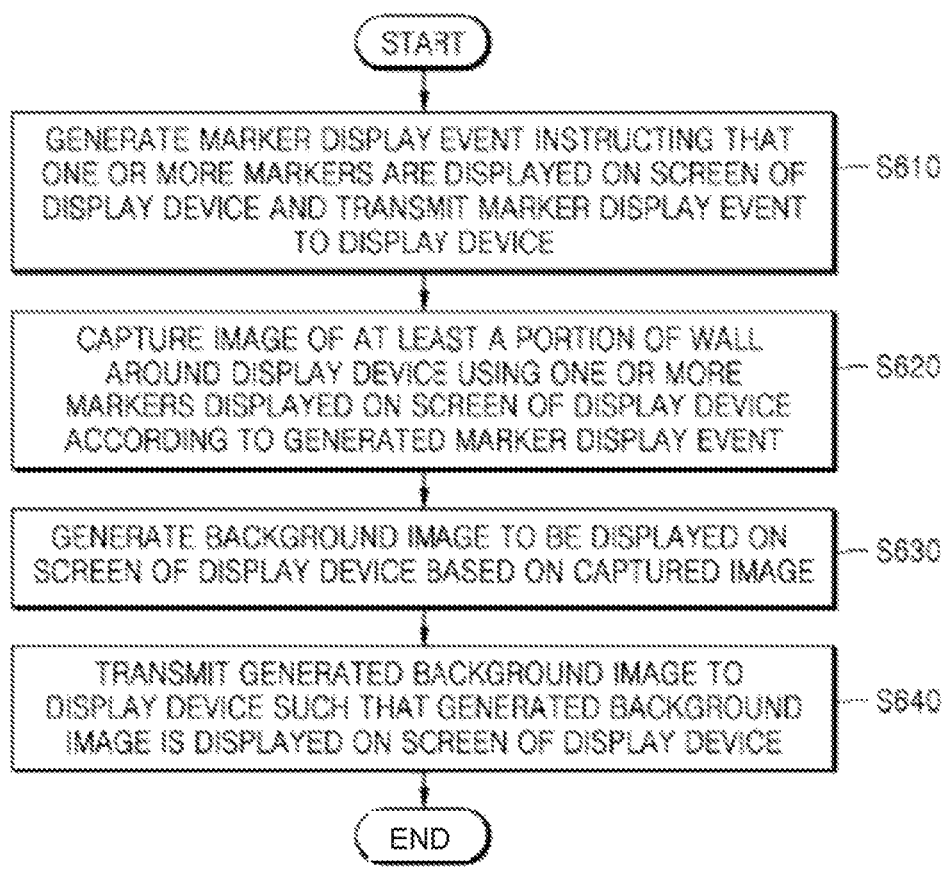
FIG. 6 illustrates a method of operating a mobile device according to an embodiment.

FIG. 6 illustrates a method of operating a mobile device according to an embodiment.

Referring to FIG. 6, in operation S610, the mobile device 100 generates an event instructing that one or more markers are displayed on a screen of the display device 200 and transmits the event to the display device 200.

According to an embodiment, the mobile device 100 may determine a position of the one or more markers to be displayed on the screen of the display device 200 by referring to screen size information of the display device 200.

According to an embodiment, the mobile device 100 may receive the screen size information of the display device 200 from a user, the display device 200, or the server 300.

According to an embodiment, the mobile device 100 may generate a marker display event including the determined position of the marker and transmit the marker display event to the display device 200.

According to an embodiment, the mobile device 100 may directly transmit the marker display event to the display device 200 or may transmit the marker display event to the display device 200 through the server 300.

In operation S620, the mobile device 100 captures an image of at least a portion of a wall around the display device 200 using one or more markers displayed on the screen of the display device according to the generated marker display event.

According to one embodiment, the mobile device 100 may capture an image of at least a portion of a wall around the display device 200 using one or more markers displayed on the screen of the display device and one or more guides displayed on the display of the mobile device.

In operation S630, the mobile device 100 generates a background image to be displayed on the screen of the display device 200 based on the captured image.

According to an embodiment, the mobile device 100 may generate a background image using a captured original image and a symmetric image of the captured original image.

In operation S640, the mobile device 100 transmits the generated background image to the display device such that the generated background image may be displayed on the screen of the display device.

According to an embodiment, the mobile device 100 may transmit the generated background image directly to the display device 200 or through the server 300.

Figure 7:
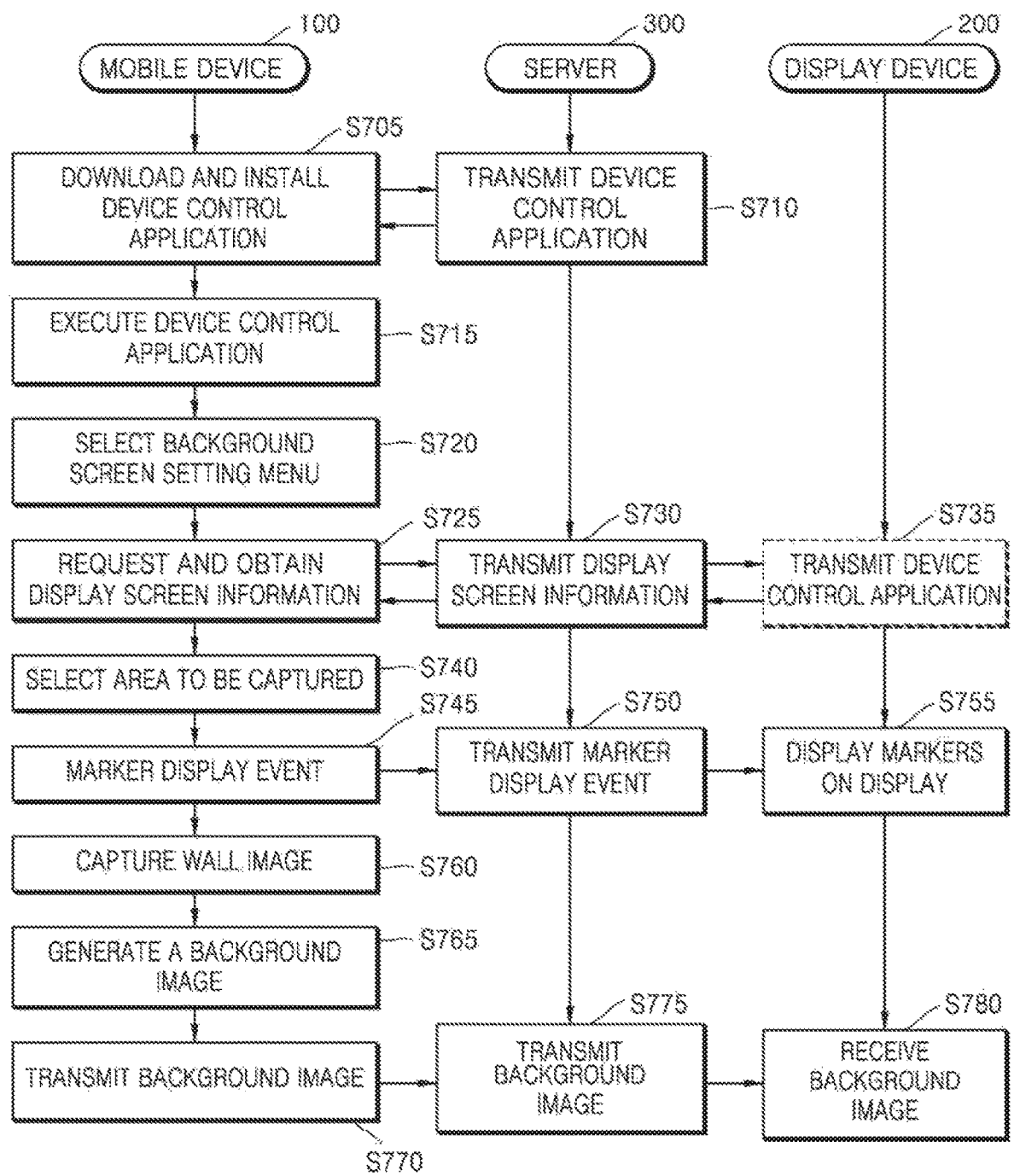
FIG. 7 is a flowchart illustrating an operation of a mobile device, a server, and a display device for displaying a background image on the display device using an image of a wall on which the display device is installed, according to an embodiment.

FIG. 7 is a flowchart illustrating an operation of a mobile device, a server, and a display device for displaying a background image on the display device using an image of a wall on which the display device is installed, according to an embodiment.

Referring to FIG. 7, in operation S705, the mobile device 100 downloads and installs a device control application, and in operation S710, the server 300 transmits the device control application to the mobile device 100.

When the mobile device 100 requests to download the device control application to the server 300, the server may transmit the device control application to the mobile device 100, and the mobile device 100 may receive and install the device control application. The device control application may include applications for controlling various devices in the home, for example, a refrigerator, a display device, a washing machine, an audio device, and the like.

In operation S715, the mobile device 100 may execute the installed device control application.

In operation S720, the mobile device 100 may receive a user input for selecting a background screen setting menu.

Figure 8:
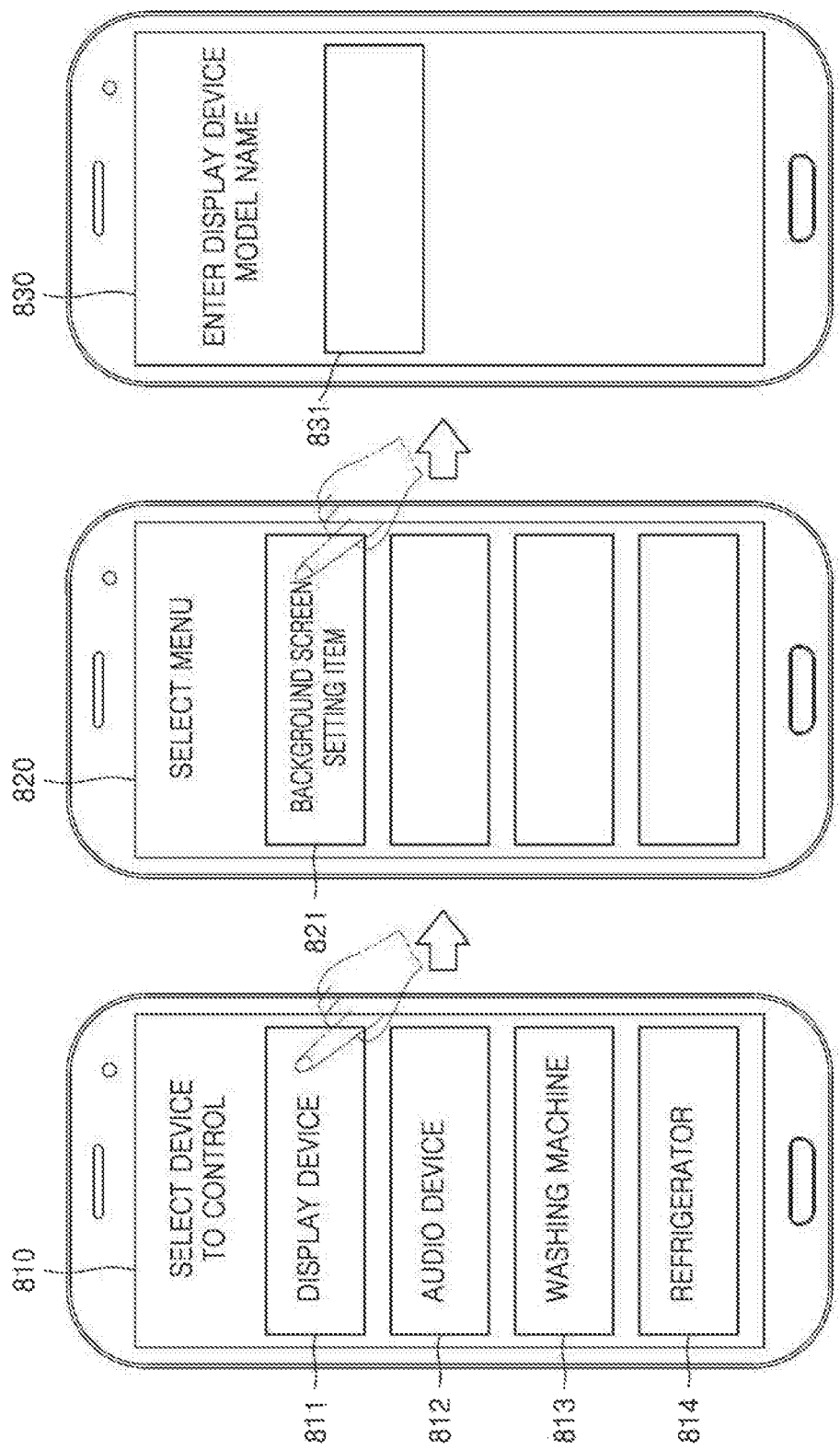
FIG. 8 illustrates a user interface provided by the mobile device 100 by executing a device control application, according to an embodiment.

FIG. 8 illustrates a user interface provided by the mobile device 100 by executing a device control application, according to an embodiment.

Referring to FIG. 8, a first user interface 810 of the device control application executed by the mobile device 100 may receive a user input for selecting a device to be controlled. The first user interface 810 may display a display device 811, an audio device 812, a washing machine 813, and a refrigerator 814 as the device to be controlled, and a user may select one of the displayed devices.

When the display device 811 is selected by the user, the mobile device 100 may output a second user interface 820. The second user interface 820 may display menu items related to control of the display device, and one of the items may include a background screen setting item 821. The background screen setting item 821 is a menu item that enables setting to display the same image as the image on a wall on which the display device is installed while the display device is not operated by a user operation.

When the background setting item 821 is selected by the user, the mobile device 100 may output a third user interface 830. The third user interface 830 may include an input window 831 through which a display device model name may be input. The mobile device 100 may receive the display device model name through the input window 831.

Again, in operation S725, the mobile device 100 may request and obtain screen information of the display device. The screen information of the display device includes the size of a display screen of the display device 200. The screen information of the display device may be used to determine positions of one or more markers to be displayed on the screen of the display device. The screen information of the display device may be included in product information of the display device, and may be obtained using the display device model name.

The mobile device 100 may obtain the screen information of the display device using the display device model name received through the third user interface 830.

In operation S730, according to an embodiment, the mobile device 100 may receive screen information of the display device corresponding to the display device model name from the server 300 by transmitting the display device model name to the server 300.

In operation S735, according to another embodiment, the server 300 may transmit the display device model name received from the mobile device 100 to the display device 200, and the display device 200 may transmit screen information of the display device corresponding to the display device model name to the mobile device 100 through the server 300.

According to another example, because the mobile device 100 stores screen information of the display device corresponding to the display device model name, the mobile device 100 may obtain screen information of the display device without requesting the server 300.

In operation S740, the mobile device 100 may select an area to be captured among images of a wall on which the display device 200 is installed. After obtaining the screen information of the display device, the mobile device 100 may be changed to a photo shooting mode.

When the mobile device 100 is positioned so that a user may obtain an image of the wall on which the display device 200 is installed, a camera of the mobile device 100 may sense the image of the wall on which the display device 200 is installed, including the display device 200, and a display of the mobile device 100 may display the image of the wall including the display device 200 as a preview image. Also, the mobile device 100 may display an outline of an area to be captured on the preview image. In addition, the mobile device 100 may receive an input for selecting one area from a user by displaying outlines of a plurality of areas to be captured. A method of selecting an area to be captured by the mobile device 100 will be described with reference to FIGS. 9 to 11.

Figure 9:
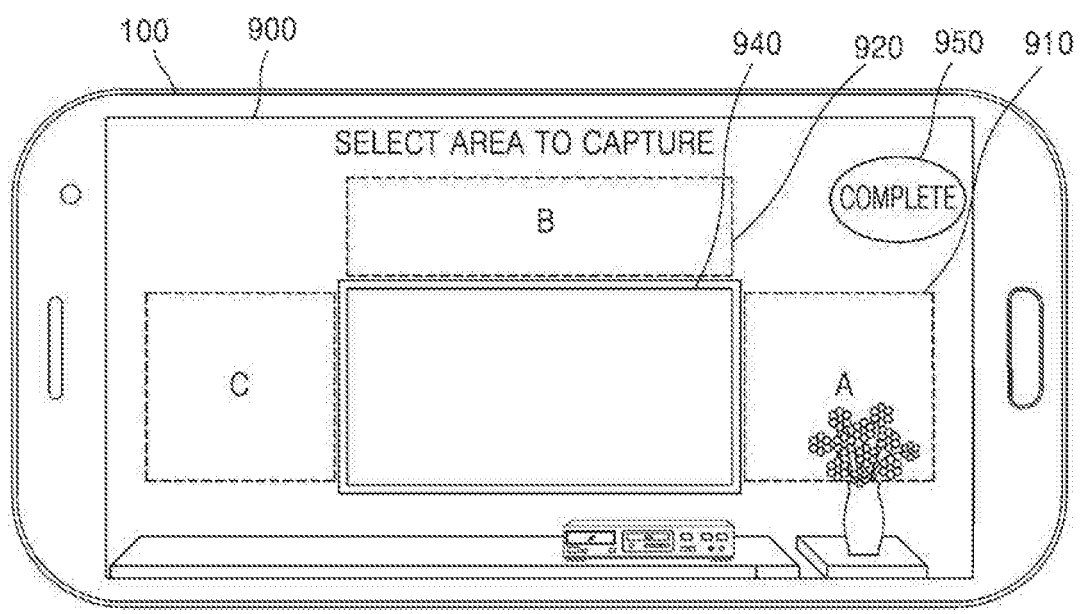
FIG. 9 illustrates an example of a preview image displayed on a display of the mobile device 100, according to an embodiment.

FIG. 9 illustrates an example of a preview image displayed on a display of the mobile device 100, according to an embodiment.

Referring to FIG. 9, the mobile device 100 displays an image of a wall on which the display device 200 is installed as a preview image 900 on the display. Also, the mobile device 100 may display a guideline for selecting an area to be captured on the displayed preview image 900. In FIG. 9, a guideline 910 indicating a right area A, a guideline 920 indicating an upper area B, and a guideline 930 indicating a left area C are displayed on the preview image 900. A user may select an image area of a wall to be captured by selecting one of outlines 910, 920, and 930.

The mobile device 100 may variously determine an area of a wall to be captured.

According to an embodiment, the mobile device 100 may internally determine an area of a wall to be captured as a default.

According to an embodiment, the mobile device 100 may display areas of a wall to be captured as shown in FIG. 9 and allow a user to select one of the areas.

According to an embodiment, the mobile device 100 may further include a <Complete> item 950 in addition to a guideline for selecting an area to be captured in the preview image 900 for selecting an area to be captured.

For example, when a user selects A, one of A, B, and C as an area to be captured on the preview image 900, and presses a <Finish> item 950, the mobile device 100 may transmit information to the display device 200 to display a marker on the right side of the display device screen such that the right wall area C of the display device may be captured, and may also display a guide for matching with a marker displayed on the display device 200 on the left side of a screen of the mobile device 100.

FIG. 10 is a view illustrating an area to be captured among peripheral walls of a display device, according to an embodiment.

1000A of FIG. 10 illustrates an example of capturing wall images of the right, upper, and left areas of peripheral walls of the display device 200 when the display device 200 is a stand type, according to an embodiment. When a screen size of the display device 200 is (horizontal X, vertical Y), the size of a left area or a right area to be captured may be determined as (horizontal X/2, vertical Y), and the size of an upper area to be captured may be determined as (horizontal X, vertical Y/2). Each of area A, area B, and area C corresponds to half the screen size of the display device 200. Therefore, by doubling the size of the captured area, a background image to be displayed on a screen of the display device 200 may be generated.

1000B of FIG. 10 illustrates an example of capturing wall images of the left, right, upper, and lower areas of peripheral walls of the display device 200 when the display device 200 is wall-mounted, according to an embodiment.

FIG. 11 is a reference diagram for describing a size of a peripheral wall area of a display device to be captured, according to an embodiment.

1100A of FIG. 11 illustrates an example of capturing wall images of the left, right, upper, and lower areas of peripheral walls of the display device 200, according to an embodiment. When a screen size of the display device 200 is (horizontal X, vertical Y), the size of a left area or a right area to be captured may be determined as (horizontal X/3, vertical Y), and the size of an upper area or lower area to be captured may be determined as (horizontal X, vertical Y/3). Each of area A, area B, area C, and area D corresponds to ⅓ of the screen size of the display device 200. Therefore, by making the size of a captured area three times larger, a background image to be displayed on a screen of the display device 200 may be generated.

1100B of FIG. 11 illustrates an example of capturing wall images of the left, right, upper, and lower areas of peripheral walls of the display device 200, according to an embodiment. When a screen size of the display device 200 is (horizontal X, vertical Y), the size of a left area or a right area to be captured may be determined as (horizontal X/4, vertical Y), and the size of an upper area or lower area to be captured may be determined as (horizontal X, vertical Y/4).

Each of area A, area B, area C, and area D corresponds to ¼ of the screen size of the display device 200. Therefore, by making the size of a captured area four times larger, a background image to be displayed on a screen of the display device 200 may be generated.

In operation S745, the mobile device 100 generates a marker display event and transmits the same to the server 300. In operation S750, the server 300 may transmit the marker display event received by the mobile device 100 to the display device 200. In operation S755, the display device 200 may display one or more markers on a display screen according to the marker display event received from the server 300.

Specific operations of operations S745, S750, and S755 will be described with reference to FIGS. 12 to 13.

Figure 12:
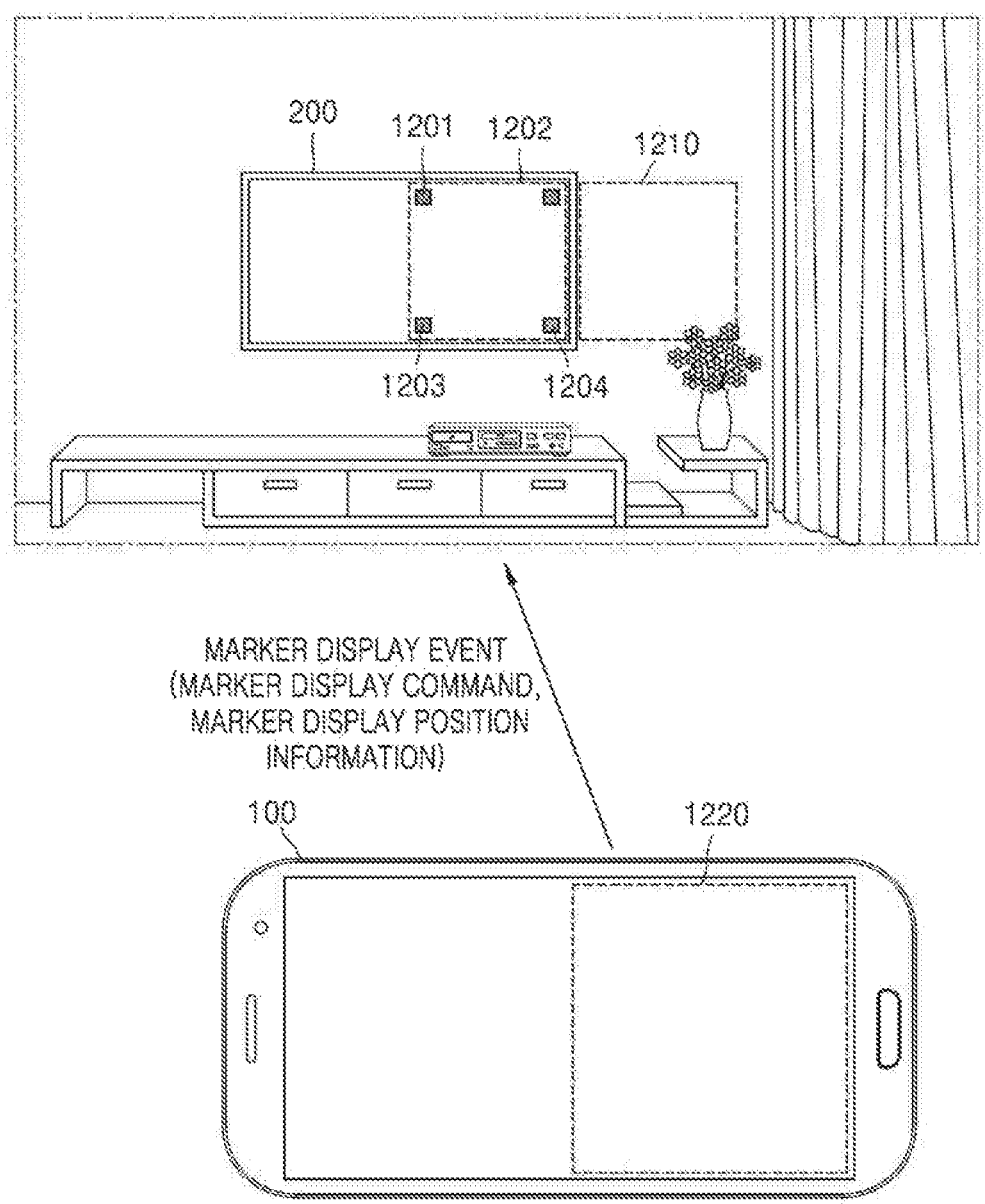
FIG. 12 is a reference diagram for describing a method of a mobile device to transmit a marker display event to a display device, according to an embodiment.

FIG. 12 is a reference diagram for describing a method of a mobile device to transmit a marker display event to a display device, according to an embodiment.

Referring to FIG. 12, the mobile device 100 may generate a marker display event 1200 using the screen information of the display device obtained in operation S725 and the captured area selected in operation S740. The marker display event is an event that causes the display device 200 to display one or more markers on a display screen. The marker display event may include position information of one or more markers to be displayed on the display screen along with a command to cause the display device 200 to display one or more markers on the display screen. The mobile device 100 may transmit the generated marker display event 1200 directly to the display device 200 or through the server 300. The display device 200 that has received the marker display event 1200 may display one or more markers 1201, 1202, 1203, and 1204 on the display screen according to marker display position information included in the marker display event. The marker display position information is changed according to the captured area selected in operation S740. As illustrated in FIG. 12A, in order to capture a right wall image i.e. an image of right wall adjacent to the display device 200, one or more markers may be displayed on the right half of a display screen of the display device 200.

In the example shown in FIG. 12, markers are displayed in a square shape, but the markers may be displayed in various shapes such as a circle or a triangle.

FIG. 13 is a view for explaining a method of determining a marker display position according to a selected captured area, according to an embodiment.

Referring to FIG. 13, when area A is selected as an area to be captured in the mobile device 100, an area of a corresponding wall is area A'. The mobile device 100 may determine a position to display one or more markers on the right half of a screen of the display device 200 to capture an image of the area A'. Accordingly, when the area A is selected, the mobile device 100 may determine marker display positions as (m1, m2, m3, and m4). Also, when area B is selected, the mobile device 100 may determine marker display positions as (m1, m6, m9, and m10) to display one or more markers on the upper half of the screen of the display device. Also, when area C is selected, the mobile device 100 may determine marker display positions as (m5, m6, m7, and m8) to display one or more markers on the left half of the screen of the display device.

In the example illustrated in FIG. 13, because an area to be captured is determined as half of the entire display device screen, one or more markers are displayed at positions corresponding to half of the display device screen. However, when the area to be captured is ⅓ or ¼ of the entire display device screen, positions of the markers are also changed accordingly.

In addition, in the example shown in FIG. 13, although it has been exemplified to display four markers on the screen of the mobile device 100, this is only an example, and the markers may be one or more.

Returning to S760 again, the mobile device 100 may capture a wall image using one or more markers displayed on the display device 200.

According to an embodiment, as shown in FIG. 12, when markers are displayed on the display device 200, a user sees the marker and moves the mobile device 100 such that the markers are positioned on the left half of the screen of the mobile device 100, and when a right area 1210 of the display device 200 is positioned in the right half on a preview image of the mobile device 100, the mobile device 100 may capture an image according to a user's image capture command.

According to another embodiment, when a user sees markers on the display device 200 and moves the mobile device 100 such that the markers are positioned on the left half of the screen of the mobile device 100, an imaging sensor of the mobile device 100 recognizes one or more markers displayed on the display device 200, and when recognition is completed, the mobile device 100 may automatically capture a wall image. The mobile device 100 may recognize a marker by comparing a feature point of a previously stored marker image with a feature point extracted from a marker displayed on the display device 200 using a marker recognition image processing technology through feature point matching.

According to another embodiment, the mobile device 100 may display one or more guides on a preview image displayed on a display screen of the mobile device 100 to more accurately capture images. When a user moves the mobile device 100 such that a guide on the preview image is positioned on one or more markers displayed on the display screen of the display device 200, the imaging sensor of the mobile device 100 may capture a wall image when one or more markers are recognized. This will be described with reference to FIGS. 14 to 16.

Figure 14:
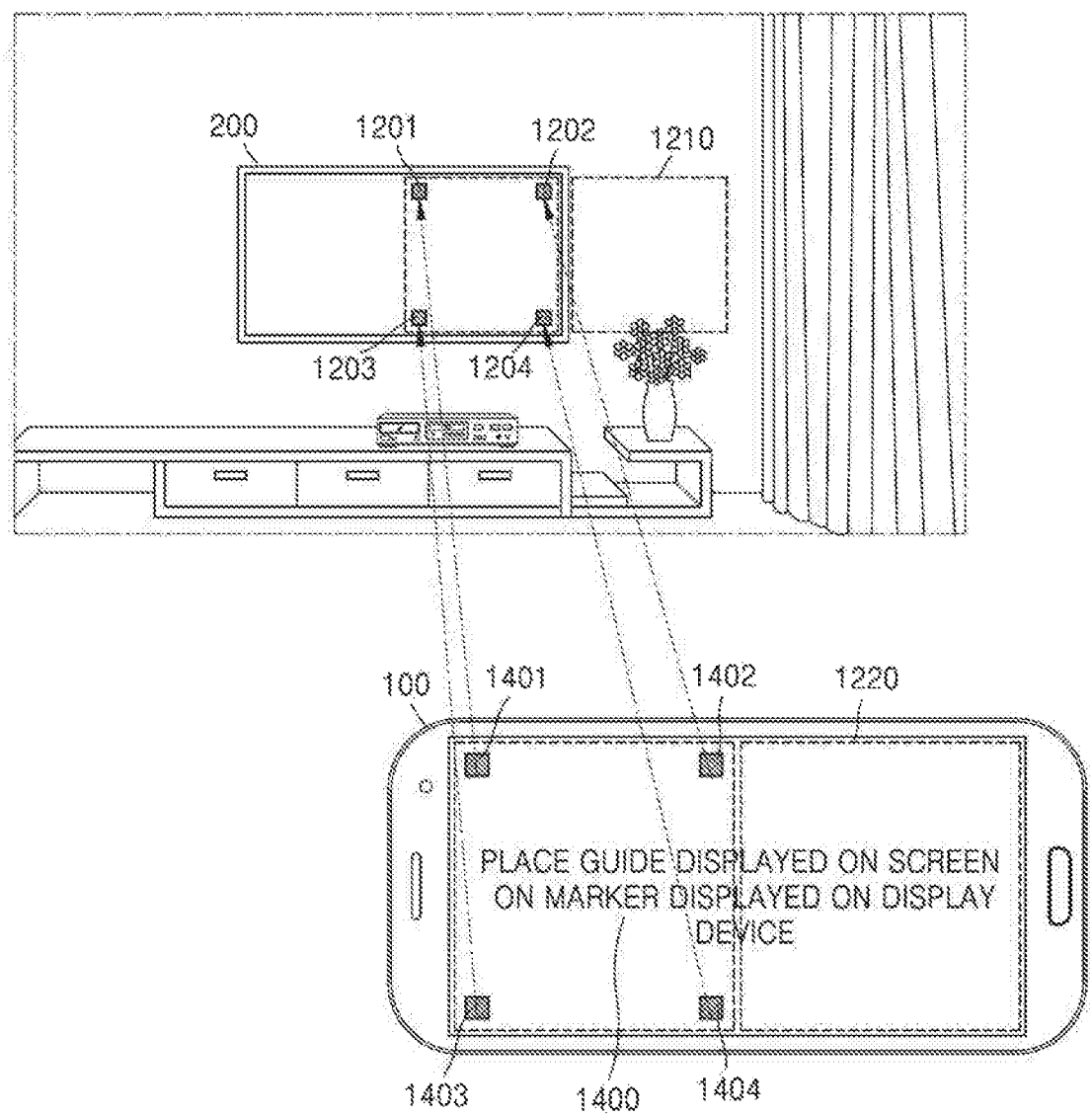
FIG. 14 is a reference diagram for explaining an example of displaying one or more guides on a mobile device, according to an embodiment.

FIG. 14 is a reference diagram for explaining an example of displaying one or more guides on a mobile device, according to an embodiment.

Referring to FIG. 14, the mobile device 100 may display one or more guides 1401, 1402, 1403, and 1404 on a preview image to help recognition of the markers 1201, 1202, 1203, and 1204 displayed on a screen of the display device 200. To enable the mobile device 100 to capture the right wall image 1210 adjacent to the display device 200, the display device 200 may display a marker on the right half screen of the display device 200 and display a guide on the left half on the preview image of the mobile device 100. When a user positions the guides 1401, 1402, 1403, 1404 on the preview image to the markers 1201, 1202, 1203, and 1204 displayed on the screen of the display device 200, respectively, the right wall image 1210 of the display device 200 may enter a right half area 1220 of the preview image displayed on the screen of the mobile device 100. Therefore, in this state, the right wall image 1210 may be obtained by capturing an image as the imaging sensor of the mobile device 100 recognizes the markers 1201, 1202, 1203, and 1204.

In addition, in order to provide help to a user, the mobile device may display a message 1400 <Place a guide displayed on a screen on a marker displayed on the display device> on the preview image.

In addition, in the example illustrated in FIG. 14, the number of markers displayed on the screen of the mobile device 100 is four, but this is only an example, and the number of markers may be one or more.

Figure 15:
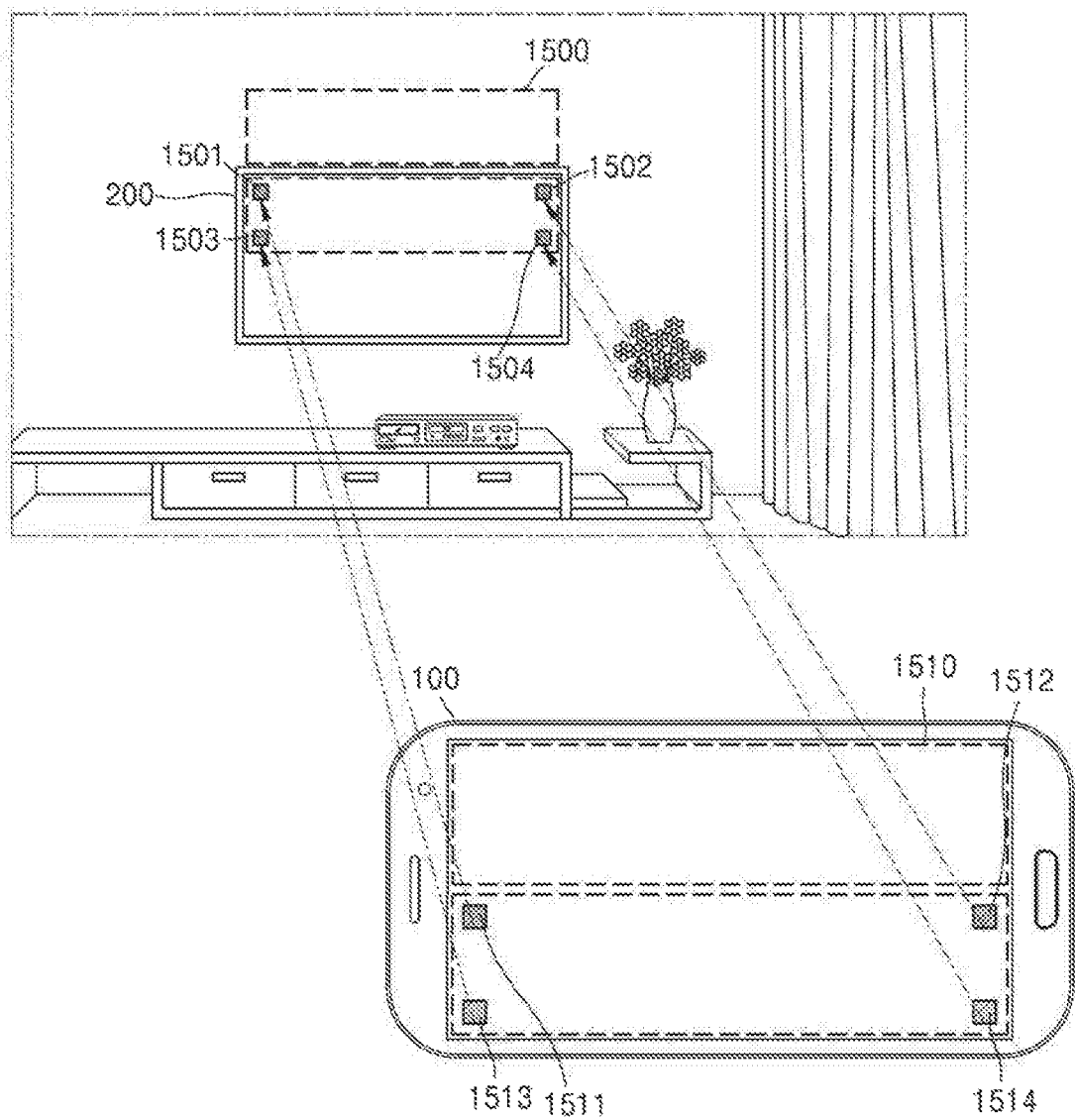
FIG. 15 is a reference diagram for explaining an example of displaying one or more guides on a mobile device, according to an embodiment.

FIG. 15 is a reference diagram for explaining an example of displaying one or more guides on a mobile device, according to an embodiment.

Referring to FIG. 15, the mobile device 100 may display one or more guides 1511, 1512, 1513, and 1514 on a preview image to help recognition of markers 1501, 1502, 1503, and 1504 displayed on a screen of the display device 200. To enable the mobile device 100 to capture an upper wall image 1510 i.e. an image of an upper wall adjacent to the display device 200, the display device 200 may display a marker on the right half screen of the display device 200 and may display the guides 1511 to 1514 on the left half on the preview image of the mobile device 100. When a user positions the guides 1511, 1512, 1513, and 1514 on the preview image to the markers 1501, 1502, 1503, and 1504 displayed on the screen of the display device 200, respectively, an upper wall image 1500 adjacent to the display device 200 may be captured within the upper half region 1510 of the preview image displayed on the screen of the mobile device 100. Therefore, in this state, the imaging sensor of the mobile device 100 may capture an image to obtain the upper wall 1500.

In operation S765 again, the mobile device 100 generates a background image using the captured wall image.

The mobile device 100 may generate a background image by processing the captured wall image.

Figure 16:
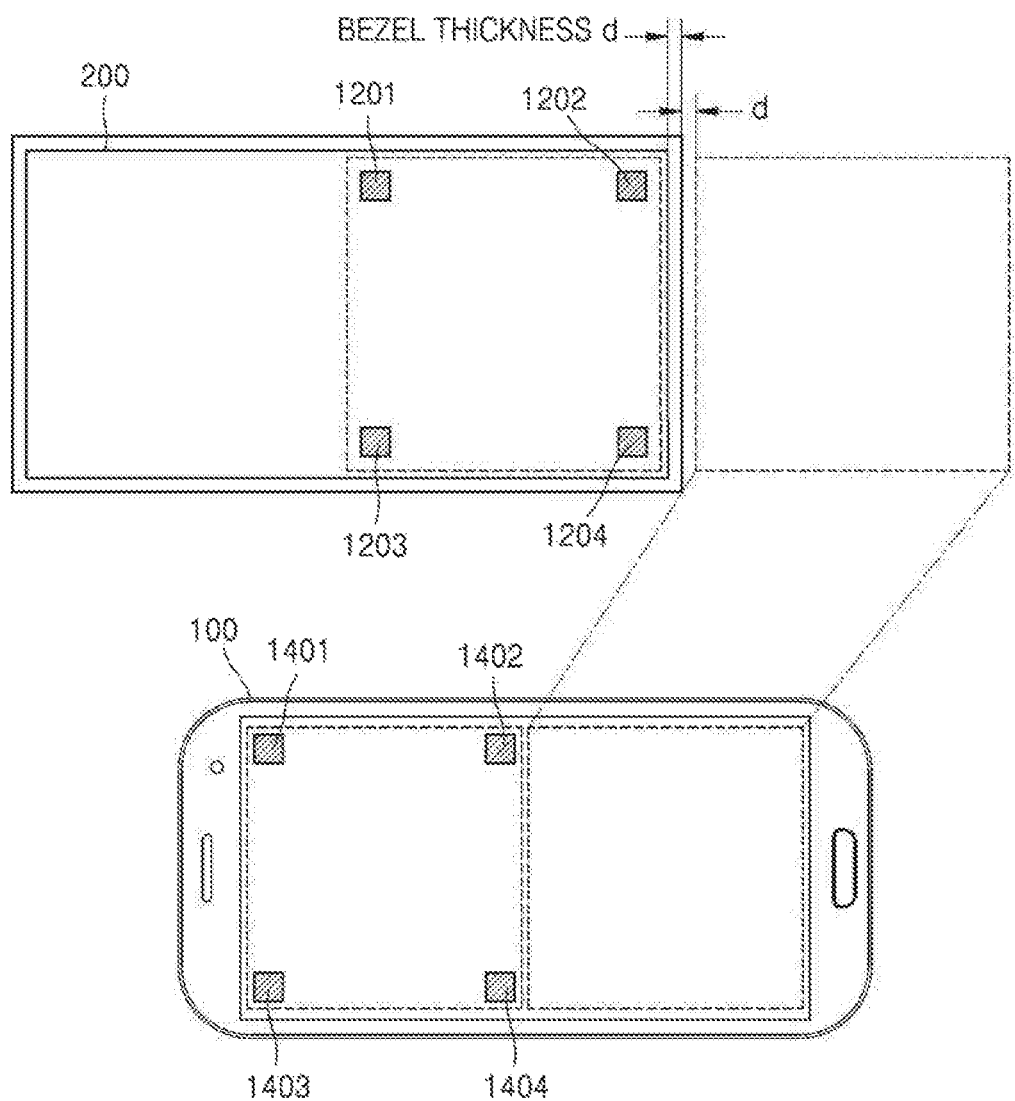
FIG. 16 is a reference diagram for describing an example of capturing an area away from a display device by a thickness of a bezel, according to an embodiment.

According to an embodiment, in order to create a natural background image that can be more harmonious with a wall, the mobile device 100, considering a bezel thickness d of the display device 200 as shown in FIG. 16, may obtain a wall image from an area spaced apart by d from the end of the bezel of the display device 200, rather than a wall image directly adjacent to the display device 200.

Meanwhile, the mobile device 100 may obtain images of a plurality of peripheral areas, and then provide a user interface to allow a user to select a desired area.

Figure 17:
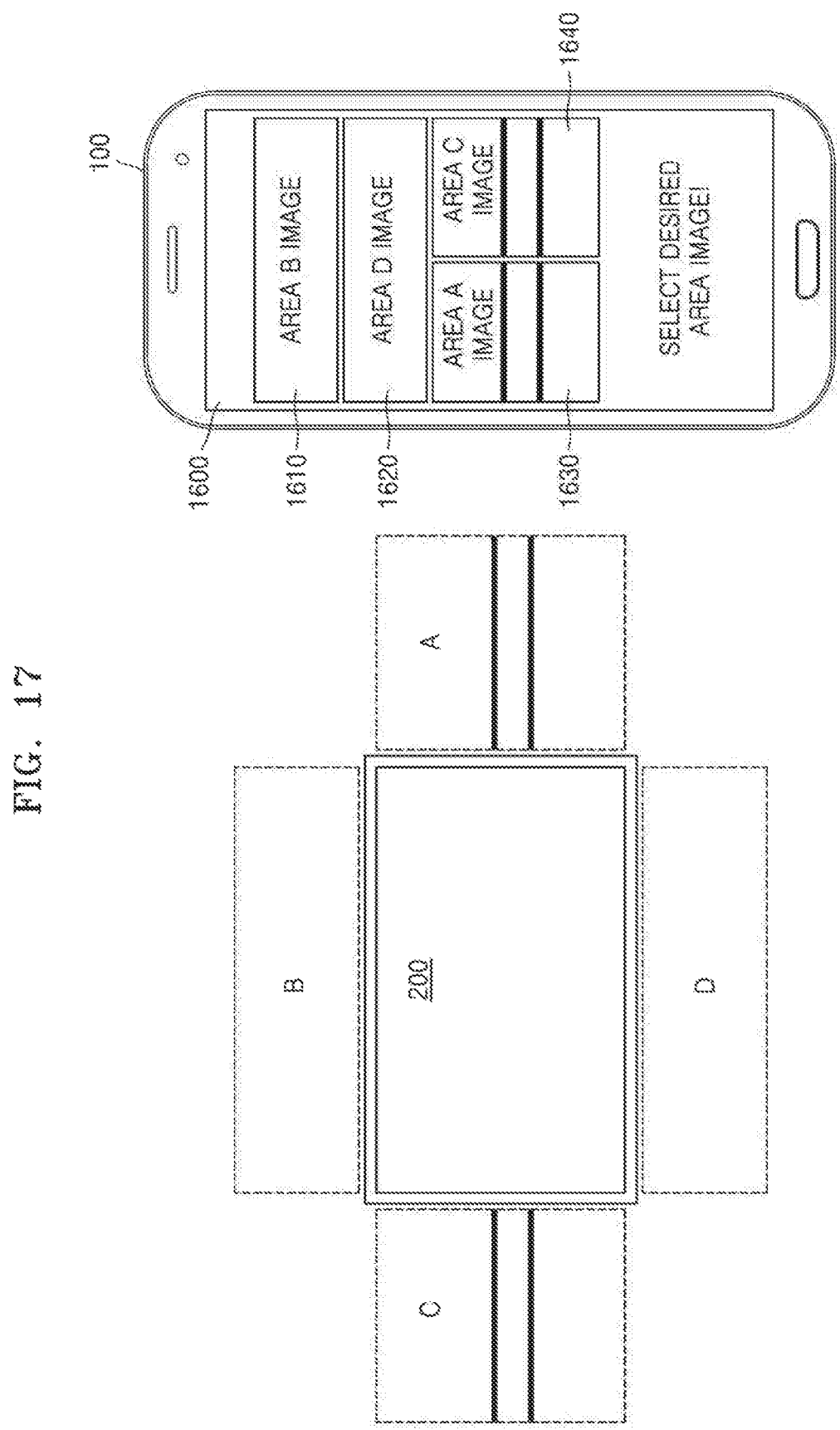
FIG. 17 is an example of a user interface capable of selecting one of a plurality of area images, according to an embodiment.

FIG. 17 is an example of a user interface capable of selecting one of a plurality of area images, according to an embodiment.

Referring to FIG. 17, the mobile device 100 may provide a user interface 1600 that obtains all images for peripheral areas A, B, C, and D, displays obtained area A image 1630, area B image 1610, area C image 1640, and area D image 1620 on the display screen, and selects one of these area images. By providing the user interface 1600, a user may select a desired image from all possible wall images. In particular, as shown in FIG. 17, when there is a pattern in a left wall area C and a right wall area A of the display device 200, it is important to select an image of the area C or the area A as a background image to be displayed on the display device 200.

When a captured area image to be used for the background image is determined, the mobile device 100 may generate a background image using the captured area image.

Figure 18:
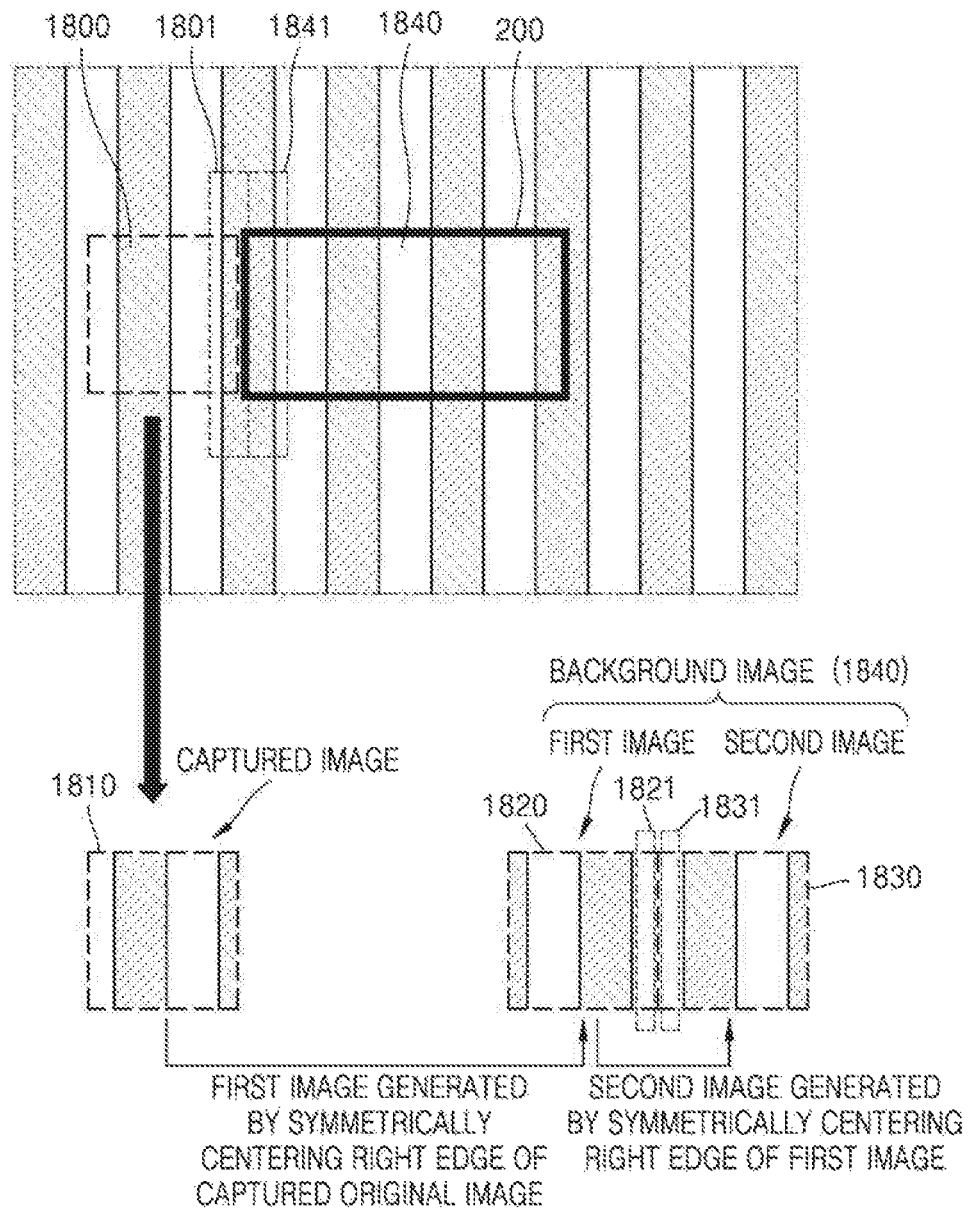
FIG. 18 is a reference diagram for explaining a method of generating a background image using a ½ captured image of a screen, according to an embodiment.

FIG. 18 is a reference diagram for explaining a method of generating a background image using a ½ captured image of a screen, according to an embodiment.

Referring to FIG. 18, when an original image 1810 captured by the mobile device 100 from a left wall area of the display device 200 is ½ of a display screen of a display device, the mobile device 100 may generate a background image by doubling the size of the original image 1810. In this case, referring to FIG. 18, when the mobile device 100 captures the image 1810 on a left wall area 1800 adjacent to the display device 200 and uses the captured original image 1810 to generate a background image to be displayed on the display device 200, it may be important to generate a background image 1840 such that the left wall area 1800 and a background image 1840 are naturally connected. For example, it is important to show that an area 1801 adjacent to the display device 200 in the left wall area 1800 and an area 1841 adjacent to the left wall area 1800 in the background image 1840 are naturally connected. Therefore, for this purpose, the mobile device 100 may position an area 1801 in the area 1841 of the background image 1840 by placing a first image 1820 generated by symmetrically centering a right edge of the captured original image 1810 in the left half of the background image 1800. By placing a second image 1830 symmetrically centered on a right edge of the first image 1820 again in the right half of the background image 1840, an image of an area 1821 may be positioned in an area 1831.

By generating the background image using a mirror image of the captured original image 1810, it is possible to generate the background image 1840 in which the areas 1801 and 1841 are naturally connected to each other and the areas 1821 and 1831 are naturally connected to each other.

Figure 19:
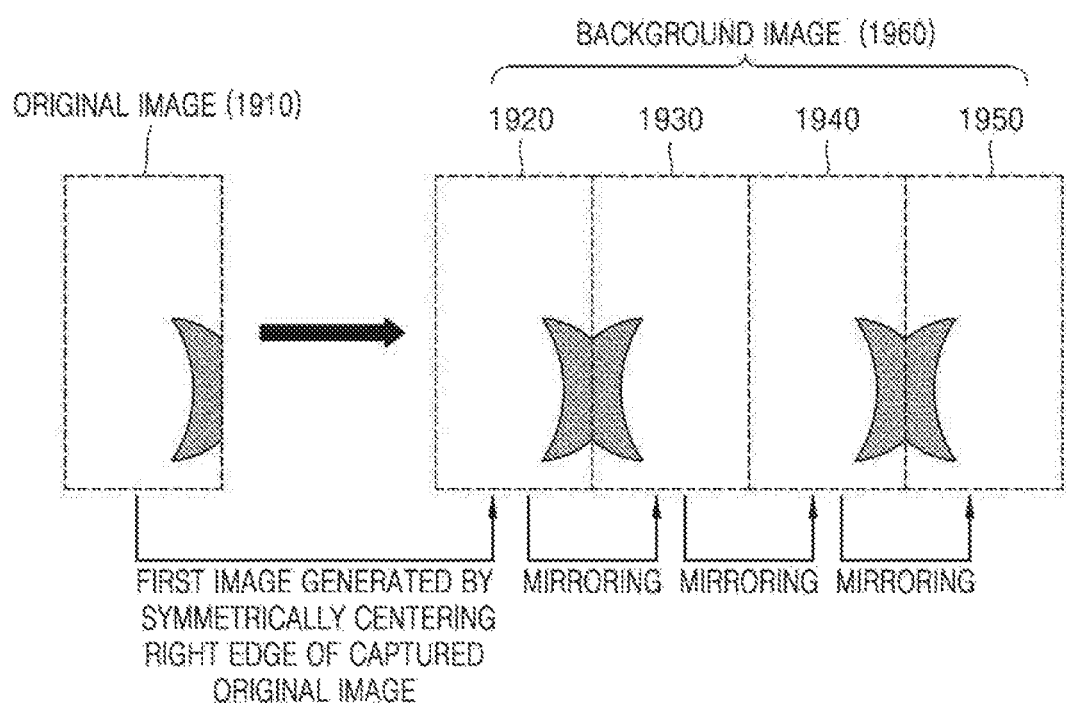
FIG. 19 is a reference diagram for explaining a method of generating a background image using a ¼ captured image of a screen, according to an embodiment.

FIG. 19 is a reference diagram for explaining a method of generating a background image using a ¼ captured image of a screen, according to an embodiment.

Referring to FIG. 19, when an original image 1910 captured by the mobile device 100 from a left wall area of the display device 200 is ¼ of a display screen of a display device, the mobile device 100 may generate a background image by making the size of the original image 1910 four times. At this time, the mobile device 100 may generate a background image 1960 by placing a first image generated by symmetrically centering a right edge of the captured original image 1910 in a first area 1920 of the background image, by placing a second image generated by symmetrically centering a right edge of the first image in a second area 1930 of the background image, by placing a third image generated by symmetrically centering a right edge of the second image in a third area 1940 of the background image, and by placing a fourth image generated by symmetrically centering a right edge of the third image in a fourth area 1950 of the background image.

Meanwhile, a user may check a background image generated by the mobile device 100 before applying the background image to the display device.

Figure 20:
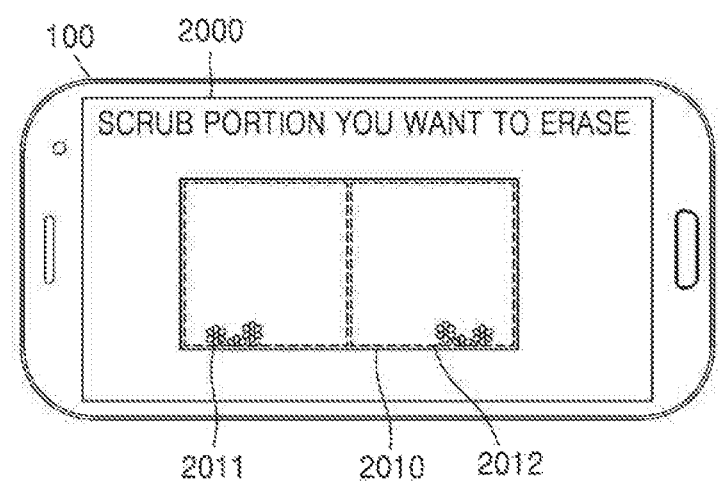
FIG. 20 illustrates an example of a user interface capable of erasing a portion to be removed from a background image generated according to an embodiment.

FIG. 20 illustrates an example of a user interface capable of erasing a portion to be removed from a background image generated according to an embodiment.

Referring to FIG. 20, the mobile device 100 may display the generated background image on a display. For example, as illustrated in FIG. 2, when the mobile device 100 captures the area 22 to generate a background image, a portion of a flower in a vase may be displayed under an image of the captured area 22, and thus some shapes 2011 and 2012 of the flower may be displayed on a generated background image 2010. A user may remove the shapes 2011 and 2012 from the background image 2010 by touching or scrubbing the some shapes 2011 and 2012 of the flower using a finger or other tool. To remove some of the shapes displayed on the image using a finger or a tool, a known picture editing technique or the like may be used.

Returning to operation S770 again, the mobile device 100 may transmit the generated background image to the display device 200.

According to an embodiment, the mobile device 100 may directly transmit the generated background image to the display device 200.

According to an embodiment, the mobile device 100 may transmit the generated background image to the display device 200 through the server 300. In operation S775, the server 300 may transmit the background image to the display device 200, and in operation S780, the display device 200 may receive the background image and display the background image on a display screen.

According to an embodiment, after the display device 200 receives and displays the background image, a user may want to change the color tone or brightness of the background image displayed on the display device 200. For example, the color tone of the background image displayed on the display device 200 may be different from the color tone of an actual wall. Therefore, in this case, the mobile device 100 may further provide a user interface that allows a user to change the color tone or brightness of the background image.

FIG. 21 illustrates an example of checking a background image displayed on the display device 200 and changing a color of the background image by a user through the mobile device 100, according to an embodiment.

Referring to FIG. 21, the display device 200 displays a background image 2110 received from the mobile device 100. In addition, the mobile device 100 may provide a user interface 2120 to change the color of the background image. When a user adjusts the color of the background image through the user interface 2120, the mobile device 100 may transmit the color-adjusted background image back to the display device 200.

According to an embodiment, when a wall on which the display device 200 is installed is a wall without any pattern, the mobile device 100 may generate a background image using a representative color of the wall on which the display device 200 is installed.

Figure 22:
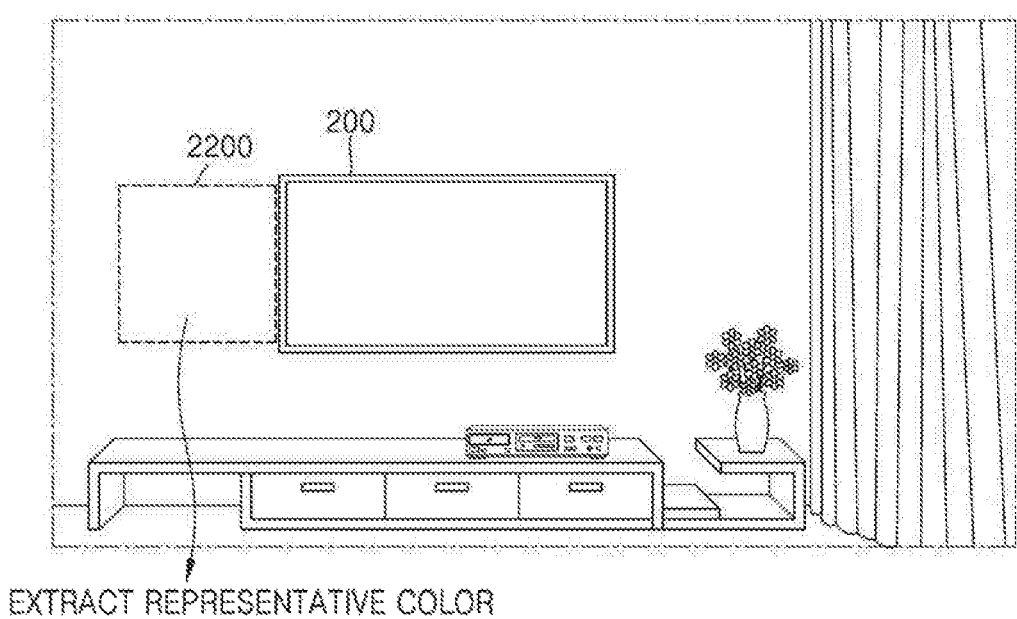
FIG. 22 is a view for explaining an example of generating a background image using a representative color of a wall, according to an embodiment.

FIG. 22 is a view for explaining an example of generating a background image using a representative color of a wall, according to an embodiment.

Referring to FIG. 22, when a wall on which the display device 200 is installed is recognized as a patternless wall having no pattern, the mobile device 100 may extract a representative color from an image obtained by capturing a peripheral wall area 2200 and generate a background image using the representative color and a screen size of the display device. That is, the mobile device 100 may generate a background image by setting an area corresponding to a background image size of the display device to a representative color.

According to an embodiment, when the wall on which the display device 200 is installed is a wall in which a certain pattern is repeated, the mobile device 100 may generate a background image using a representative pattern of the wall on which the display device 200 is installed.

Figure 23:
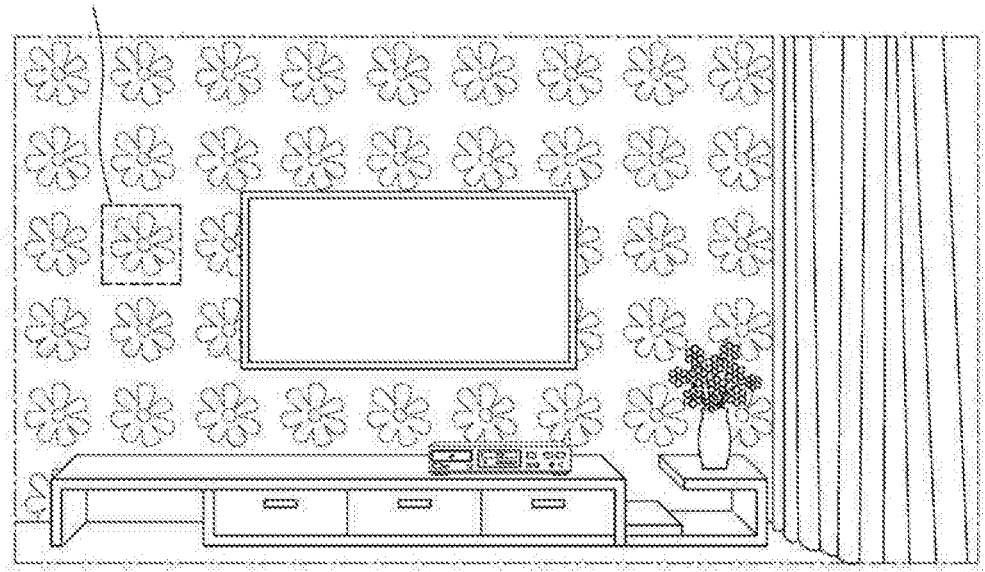
FIG. 23 is a view for explaining an example of generating a background image using a representative pattern of a wall, according to an embodiment.

FIG. 23 is a view for explaining an example of generating a background image using a representative pattern of a wall, according to an embodiment.

Referring to FIG. 23, when a wall on which the display device 200 is installed is recognized as a wall in which a uniform pattern is repeated uniformly, the mobile device 100 may extract a representative pattern from an image obtained by capturing a peripheral wall area 2300 and generate a background image using the representative pattern and a screen size of the display device. That is, the mobile device 100 may generate a background image by repeatedly arranging a representative pattern in an area corresponding to a background image size of the display device.

A method of operating a mobile device, a display device, and a server according to an embodiment may be implemented as program commands which can be executed by various computer means, and recorded on a computer-readable medium. The computer-readable medium may include program instructions, data files, data structures or a combination thereof. Program instructions recorded on the medium may be particularly designed and structured for the present disclosure or available to those of skill in computer software. Examples of the computer-readable recording medium include magnetic media (e.g., hard discs, floppy discs, or magnetic tapes), optical media (e.g., CD-ROMs or DVDs), magneto-optical media (e.g., floptical discs), and hardware devices that are specially configured to store and carry out program commands (e.g., ROMs, RAMs, or flash memories). Program commands may include, for example, high-level language code that can be executed by a computer using an interpreter, as well as machine language code made by a compiler.

It should be understood that example embodiments described herein should be considered in a descriptive sense only and not for purposes of limitation. Descriptions of features or aspects within each example embodiment should typically be considered as available for other similar features or aspects in other example embodiments. While one or more example embodiments have been described with reference to the figures, it will be understood by those of ordinary skill in the art that various changes in form and details may be made therein without departing from the spirit and scope as defined by the following claims.

The invention claimed is:

1. An electronic device comprising:
a camera;
a display;
a communication interface;
a memory storing one or more instructions; and
a processor configured to execute the one or more instructions to:
generate an event instructing to display one or more markers on a screen of a display device and transmit the event to the display device;
control the display to display a preview image comprising one or more guides and a portion of a wall around the display device to be captured when the one or more guides are positioned to the one or more markers;
control the camera to capture an image of the portion of the wall around the display device based on the preview image according to the generated event;
generate a background image to be displayed on the screen of the display device based on the captured image; and
transmit the generated background image to the display device such that the generated background image is displayed on the screen of the display device.

2. The electronic device of claim 1, wherein the processor is configured to execute the instructions to:
obtain size information about the screen of the display device; and
determine a position on which the one or more markers is displayed on the screen of the display device based on the obtained size information and generate the event including information about the determined position.

3. The electronic device of claim 1, wherein the processor is configured to execute the instructions to control the camera to capture the image of the portion of the wall around the display device using the one or more markers displayed on the screen of the display device and the preview image displayed on the display.

4. The electronic device of claim 1, wherein the portion of the wall comprises at least one of a left area, a right area, an upper area, and a lower area of a wall adjacent to the display device.

5. The electronic device of claim 1, wherein the processor is configured to execute the instructions to:
when the captured image is an image captured from a left area or a right area of a wall adjacent to the display device, obtain a symmetric image by symmetrically arranging the captured image in the left or right direction of the captured image; and
when the captured image is an image captured from an upper area or a lower area of the wall adjacent to the display device, obtain the symmetric image by symmetrically arranging the captured image in the upper or lower direction of the captured image.

6. The electronic device of claim 1, wherein the processor is configured to execute the instructions to transmit the event and the background image to the display device through a server.

7. The electronic device of claim 1, wherein the processor is configured to execute the instructions to:
control the camera to obtain the background image which is displayed on the screen of the display device and a peripheral area of the display device;
adjust an attribute of the background image displayed on the screen using an attribute of the peripheral area; and
transmit the background image with the adjusted attribute to the display device.

8. The electronic device of claim 1, wherein the processor is configured to execute the instructions to generate the background image by combining one or more copies of the captured image and one or more copies of a symmetric image of the captured image.

9. The electronic device of claim 8, wherein the processor is configured to execute the instructions to generate the background image by combining the captured image with the symmetric image of the captured image when a size of the captured image is half of a size of the background image.

10. A method of operating an electronic device, the method comprising:
generating an event instructing to display one or more markers on a screen of a display device and transmit the event to the display device;
displaying a preview image comprising one or more guides and a portion of a wall around the display device to be captured when the one or more guides are positioned to the one or more markers;
capturing an image of the portion of the wall around the display device based on the preview image according to the generated event;
generating a background image to be displayed on the screen of the display device based on the captured image; and
transmitting the generated background image to the display device such that the generated background image is displayed on the screen of the display device.

11. The method of claim 10, further comprising:
obtaining size information about the screen of the display device; and
determining a position on which the one or more markers are displayed on the screen of the display device based on the obtained size information and generating the event including information about the determined position.

12. The method of claim 10, further comprising capturing the image of the portion of the wall around the display device using the one or more markers displayed on the screen of the display device and the preview image displayed on the display.

13. A non-transitory computer-readable recording medium having recorded thereon a program including instructions, that, when executed, cause at least one processor to:
generate an event instructing to display one or more markers on a screen of a display device and transmit the event to the display device;
display a preview image comprising one or more guides and a portion of a wall around the display device to be captured when the one or more guides are positioned to the one or more markers;
capture an image of the portion of the wall around the display device based on the preview image according to the generated event;
generate a background image to be displayed on the screen of the display device based on the captured image; and
transmit the generated background image to the display device such that the generated background image is displayed on the screen of the display device.

* * * * *